(12) United States Patent
Bacher et al.

(10) Patent No.: US 11,526,610 B2
(45) Date of Patent: Dec. 13, 2022

(54) PEER-TO-PEER NETWORK FOR BLOCKCHAIN SECURITY

(71) Applicant: Veracode, Inc., Burlington, MA (US)

(72) Inventors: Anna Bacher, Vienna (AT); Erich Gstrein, Vienna (AT)

(73) Assignee: Veracode, Inc., Burlington, MA (US)

( * ) Notice: Subject to any disclaimer, the term of this patent is extended or adjusted under 35 U.S.C. 154(b) by 547 days.

(21) Appl. No.: 16/418,475

(22) Filed: May 21, 2019

(65) Prior Publication Data

US 2020/0372154 A1 Nov. 26, 2020

(51) Int. Cl.
| | |
|---|---|
| *G06F 21/56* | (2013.01) |
| *G06F 21/55* | (2013.01) |
| *H04L 9/40* | (2022.01) |
| *G06N 20/00* | (2019.01) |
| *H04L 41/0681* | (2022.01) |
| *G06F 16/182* | (2019.01) |

(52) U.S. Cl.
CPC ........ *G06F 21/566* (2013.01); *G06F 16/1824* (2019.01); *G06F 16/1834* (2019.01); *G06F 21/552* (2013.01); *G06N 20/00* (2019.01); *H04L 41/0681* (2013.01); *H04L 63/1408* (2013.01); *H04L 63/1433* (2013.01)

(58) Field of Classification Search
CPC ......... G06F 21/50–568; G06F 16/1824; G06F 16/1834; G06N 20/00–20; H04L 41/0681; H04L 63/14–1491
See application file for complete search history.

(56) References Cited

U.S. PATENT DOCUMENTS

| | | | |
|---|---|---|---|
| 9,774,632 B2* | 9/2017 | Gallant | H04L 63/0823 |
| 2018/0307979 A1* | 10/2018 | Selinger | G06F 9/46 |
| 2019/0222586 A1* | 7/2019 | Sachkov | H04L 63/1416 |
| 2019/0379642 A1* | 12/2019 | Simons | H04L 63/0414 |
| 2019/0379699 A1* | 12/2019 | Katragadda | G06N 3/006 |

(Continued)

FOREIGN PATENT DOCUMENTS

WO WO-2020209413 A1 * 10/2020 ............. G06N 20/00

OTHER PUBLICATIONS

Kolokotronis N, Brotsis S, Germanos G, Vassilakis C, Shiaeles S. On blockchain architectures fortrust-based collaborative intrusion detection. In2019 IEEE world congress on services (SERVICES) Jul. 8, 2019 (vol. 2642, pp. 21-28). IEEE. (Year: 2019).*

*Primary Examiner* — Madhuri R Herzog
(74) *Attorney, Agent, or Firm* — Gilliam IP PLLC

(57) ABSTRACT

A method and apparatus utilize a peer-to-peer network of security nodes collectively adhering to a protocol for inter-node communication. The system is comprised a plurality of first security nodes, at least one second security node, and at least one third security node. The plurality of first security nodes receive at least one of pre-trained detection models and rules, monitor at least one of a blockchain and connected devices for malicious behavior based on the received at least one of pre-trained detection models and rules, and report the malicious behavior. The at least one second security node creates and communicates the at least one of pre-trained detection models and rules to the plurality of first security nodes. The at least one third security node is informed by the at least one second security node of the reported malicious behavior.

42 Claims, 8 Drawing Sheets

(56) References Cited

U.S. PATENT DOCUMENTS

| | | | |
|---|---|---|---|
| 2020/0099698 A1* | 3/2020 | Kundu | G06F 9/45558 |
| 2020/0204580 A1* | 6/2020 | Konda | H04L 9/3247 |
| 2021/0049509 A1* | 2/2021 | Yang | G06K 9/6262 |

* cited by examiner

PEER-TO-PEER NETWORK FOR BLOCKCHAIN SECURITY

BACKGROUND OF THE DISCLOSURE

1. Field of the Disclosure

The disclosure relates in general to blockchain, and more particularly, to blockchain security.

2. Background Art

Blockchain can benefit society in profound and diverse ways. By ensuring that value is correctly and safely exchanged between parties, blockchain technology will transform industries that rely on centralized assurance mechanisms, including critical services, such as financial institutions, healthcare providers, national and state authorities, land registers, energy sector, cybersecurity defense, and others. But, before a full potential of blockchain can be realized, crucial security limitations that exist within blockchains have to be addressed and overcome.

Currently, a blockchain based system is considered to be as secure as its consensus model. A blockchain system can safeguard a transaction and a block order, protecting all key properties of a blockchain including immutability and auditability, but only when underlying assumptions are correct and a consensus model can uphold a state of the blockchain under failure and adversarial conditions.

The use of consensus models enables securing of only a blockchain ledger immutability against pre-defined adversarial conditions, but not securing smart contracts that are running on it, not securing the blockchain network perimeter, and not securing blockchain underlying technology.

Smart contracts can contain security vulnerabilities, bugs and malware that affect not only a party that places a smart contract into a blockchain, but also blockchain performance itself. Via security vulnerabilities, attackers can compromise a smart contract, forcing it to perform undesired behaviors, including crashing, sending monetary funds to unauthorized parties, initiating a Distributed Denial of Service (DDos) attack on an underlying blockchain, exposing user information, etc. Security vulnerabilities often manifest themselves in subtle ways that are not obvious to code reviewers or developers themselves. Two known examples of security vulnerabilities for Ethereum smart contracts that were not discovered by top programmers were a Decentralized Autonomous Organization (DAO) attack in 2016 and a security exploit in Parity wallet in November 2017. Both attacks caused significant financial damages and reputational losses. The developers were a cross-collaboration between the Ethereum foundation (literally the creators of Ethereum), the Parity core team, and members of the Ethereum open-source community. Both smart contracts underwent extensive peer review.

As for network perimeter, due to distributed nature of a blockchain, lack of blockchain-based collaborative intrusion detection systems and a significant number of participating untrusted peers, monitoring network traffic for security purposes to/from each connected peer is not performed for public blockchains and not trivial to perform for private (closed) blockchains. As a result, network attacks against blockchains is an everyday reality.

The blockchain underlying technology is also prone to software security exploits that open doors to cyber attacks against blockchain and smart contracts. The recent security vulnerability found on Jan. 15, 2019 in the Ethereum Improvement Proposal (EIP) 1283, if implemented, could provide attackers a loophole in the code to steal user funds from smart contracts. This is similar to one of the vulnerabilities found in the DAO attack of 2016. In this case, top Ethereum developers again, couldn't find it during extensive code review.

One more blockchain security limitation lays in the very core element of a blockchain: a consensus algorithm. Consensus algorithms are designed to protect a blockchain against pre-defined adversarial conditions. Should new security threats appear, a consensus algorithm may need to be enhanced with new logic. This comes at the cost of ongoing protocol change that happens at a base blockchain protocol layer. Base layer protocol change requires governance. Ongoing blockchain governance in the words of Ethereum founder may be " . . . causing ongoing political uncertainty or collapsing into centralization," undermining the core principles of blockchain. Moreover, adding defense mechanisms against new attack types to a consensus algorithm itself is a reactive measure that can be applied after an attack has occurred and caused its financial and reputational damage.

Also, there is a growing number of connected devices, such as Internet of Things (IoT), drones, etc., that could benefit profoundly from added blockchain security. Connected devices are typically characterized by low power and limit processing requirements that prevent their protection by any traditional resource consumption security approaches, such as centralized intrusion detection systems.

Current security defense approaches against mentioned blockchain security limitations cannot and will not deliver performance, reliability or adaptability that is necessary to achieve mainstream global adoption of blockchain technology.

Security limitations for smart contracts are currently addressed by manual smart contract audit services. This approach has its own limitations: a) smart contract audit services are done manually, therefore, being labor-intensive, cost-intensive, and prone to human error, b) verification happens at a certain moment of time, such as at a time of smart contract creation, and before it's placed into the blockchain which does not guarantee that bad actors will not find new vulnerabilities in the future, after the contract is deployed on the blockchain, c) all smart contract services are programming language dependent, meaning that they can't support smart contracts written in multiple programming languages that are supported simultaneously by modern blockchains, i.e., when a hyper ledger supports Java and Go as major programming languages, d) smart contract audit is based on static and dynamic analysis tools that can only detect a limited subset of possible errors based on the pre-defined hand-engineered rules and, therefore, can't identify and protect against emerging threat models and zero-days vulnerabilities and malware. Currently, known smart contract audit services/providers include: a) Quantstamp is a smart contract audit company that conducts manual audits and is developing a Quantstamp protocol, which attempts to enhance smart contract security and reputation of projects that create smart contracts by producing publicly verifiable audit reports, b) Solidified is a company offering full-audit service for smart contracts based on Solidity, c) Securify is an open source security analyzer for Ethereum smart contracts that is able to prove contract behaviors as safe/unsafe with respect to a given property, d) the Mythril Platform is a Software as a Service (SaaS) platform and tools ecosystem for developers, Mythril providing security analysis to smart contract development environments and build pipelines with its purpose being to raise the baseline security level of all smart contracts deployed on the Ethereum blockchain, e) Slither is a static analysis framework with detectors for many common Solidity issues.

Currently, an alternative to smart contract audit services for securing smart contracts running on blockchains is to add a formal verification layer as part of the blockchain technology. The formal verification layer can come in a form of an Intermediate-Level Blockchain Language. One example of this approach is IELE—a Low Level Virtual Machine (LLVM)-like language for the blockchain that was specified formally and its implementation, a virtual machine, generated from the formal specification. A limitation of this approach is that it's blockchain specific and requires development and adoption of a new virtual machine in addition to, or as a replacement of, a native blockchain virtual machine. An additional limitation comes from usage of formal verification itself and is several-fold: a) not sufficient for complicated protocols, b) needs templates and languages which are suitable for formal verification, c) formal verification language may protect against known attacks, but lacks ability to adapt and protect against new emerging attack vectors. With every new attack the language may require new adaptation and deployment that makes this solution reactive to attacks.

Alternatively, a formal specification layer may come as part of the underlying blockchain technology itself, such as Tezos blockchain. This approach improves smart contract security significantly in comparison to blockchains that don't have this functionality, but comes with formal verification limitations stated earlier. Another alternative is to use formal verification as part of a smart contract audit process, such as that offered by CertiK. Using formal verification is a step toward increasing smart contracts security in comparison to manual smart contract audit. However, in addition to the limitation of formal verification, this product requires a manual feature, that is labeling for every smart contract using formal verification functional language, that makes this approach error prone, laborious, and also limits its potential to be used in real-time security monitoring.

As an alternative to blockchain that offers a formal verification layer as part of an underlying technology, there are a number of emerging blockchain architectures that focus on improving smart contract performance. One such architecture is based on Ekiden that is a platform for preserving confidentiality, trustworthiness, and performant smart contracts, addressing smart contracts' lack of confidentiality and poor performance that are inherited from underlying blockchains. Ekiden combines blockchains with Trusted Execution Environments (TEEs). Ekiden leverages a novel architecture that separates consensus from execution, enabling efficient TEE-backed confidentiality, preserving smart contracts and high scalability. A major limitation of this approach is that Ekiden does not prevent contract-level leakage (e.g. through security vulnerabilities, bugs, or side channels). Thus, contract developers are responsible for ensuring that no secret is revealed through public output, and that the smart contract is free of bugs, security vulnerabilities, and side channels.

Lack of an actively protected blockchain network perimeter is addressed by manual network scanning activities. This approach is not real-time, consistent, and scalable, to ensure network security.

Blockchain's underlying technology security limitations are tackled by blockchain developers by applying security patches, often after a cyber attack. For example, Ethereum is working to close notorious vulnerabilities in its base code with the support of multiple researchers and white hat hacker organizations.

Limitations of blockchain's consensus algorithms are sometimes addressed by adding either a coordinator node or a "police" like node that aims to observe behavior of other nodes and act as an addition to the consensus algorithm. For example, Internet of Things Application (IOTA) has introduced a coordinator node, which is a special node that secures the network during its infancy. This has led to criticism from the blockchain community as it is lacking decentralization as this coordinator node introduces a single-point-of-failure. If a regulator or a hacker shuts down the coordinator node, the network would also go down.

Polkadot utilizes the "Fisherman node" concept. Fishermen get their reward through a timely proof that at least one bonded party acted illegally. Illegal actions include signing two blocks each with the same ratified parent or, in the case of parachains, helping ratify an invalid block. Polkadot relies on the Fisherman's reward to combat security threats.

Although these approaches are valuable first steps towards more security on blockchains, they suffer from fundamental, inherent shortcomings. Auditing processes, as exemplary by Quantstamp or Solidified, introduce a manual step which is not only impacting scalability but also introduces the "human factor" in the validation process. The result of an auditing process is not only as good as the auditor, but it opens the door for abusing the position or role of the auditing expert or company. This is especially true in situations where companies such as Solidified are also offering certificates for auditors. For example, the auditor may be a fraudster. The fisherman concept of Polkadot has similar shortcomings, for example who assures that the fisherman, a white hat hacker, does not turn into a black hat hacker when it is worth the prize? Although auditing processes and training might help to improve the skillsets of smart contract developers, they not only fail to assure a proper security level, they also introduce a fragile, non-scalable bottleneck, which is not in line with the idea of a distributed ledger.

Additionally, the certification process happens before a smart contract is deployed on the blockchain resulting in verification of a smart contract's state only at a certain moment in time. It does not guarantee that bad actors will not find new vulnerabilities in the future, after the contract is deployed. Therefore, offline smart contract auditing is a good stepping-stone towards protecting a smart contract but is not a robust end-to-end solution to ensure that funds, reputation and personal data are secure on a blockchain. Moreover, this approach also fails to address one of the major cybersecurity problems, identifying whether a smart contract is itself malware.

Automated formal verification-based tools, such as CertiK, support the programmer by avoiding typical, thus known, bugs during creation, but are limited due to the information basis which has to be provided. As a result, the performance of this solution depends on the human-defined patterns. Verification tools are made for programmers only who integrate them into their development process, but who guarantees that the programmer has recognized and fixed all alerts that a tool has highlighted? And, how can a user, that is not a trained developer, of a smart contract benefit from formal verification tools? Furthermore, such formal verification processes perform static analyses of smart contracts under creation but do not take the dynamic context of in-production usage into account.

Another limitation of defense approaches is that none of them are able to find the zero-day exploits in a consistent way. It's the major security limitation, as history shows no cyber weapon is more coveted than the zero-day exploit that targets a vulnerability nobody, other than the attackers, are aware of yet.

Adding economic logic and assumptions against any possible attack types into a consensus algorithm itself, meaning adding more functionality into a base-layer of a blockchain, is counterproductive as it requires a frequent ongoing basis blockchain protocol change, and as a result governance overhead. As a number of bad actors and attack types are ongoingly increasing, changing basis blockchain protocols to adapt to any new attack will become costly and impractical. Also, adding defense mechanisms against new attack types to a consensus algorithm itself is a reactive measure that can only be applied after an attack has happened and caused its financial and reputational damage.

In summary, current approaches are valuable first steps but not sufficient to provide the security level which is needed in distributed ledger environments, such as blockchain.

SUMMARY OF THE DISCLOSURE

The disclosure is directed to a system comprised of a peer-to-peer network of security nodes collectively adhering to a protocol for inter-node communication. The system is comprised a plurality of first security nodes, at least one second security node, and at least one third security node. The plurality of first security nodes receive at least one of pre-trained detection models and rules, monitor at least one of a blockchain and connected devices for malicious and good behavior based on the received at least one of pre-trained detection models and rules, and report the malicious behavior associated with at least one of the monitored blockchain and the monitored connected devices. The at least one second security node creates the at least one of pre-trained detection models and rules, communicates the at least one of pre-trained detection models and rules to the plurality of first security nodes, and receives from at least one of the plurality of first security nodes the reported malicious behavior associated with at least one of the monitored blockchain and the monitored connected devices. The at least one third security node is informed by the at least one second security node of the reported malicious behavior associated with at least one of the monitored blockchain and the monitored connected devices.

It is contemplated that the plurality of first security nodes, the at least one second security node, and the at least one third security node form a security detection loop, the system including a plurality of security detection loops each coupled to a security blockchain ledger, the security blockchain ledger also coupled to at least one of the monitored blockchain and the monitored connected devices.

It is contemplated that the protocol is a consensus protocol, and each of the plurality of security detection loops utilize the consensus protocol to guaranty validity of cybersecurity artifacts before sending warning alerts to at least one of a traditional blockchain node and third parties, add cybersecurity artifacts into a security blockchain ledger, and use the cybersecurity artifacts for training of self-learning detection models.

It is contemplated that each of the plurality of first security nodes is installed on a traditional blockchain node or registered in the system as an independent first security node running separately from the traditional blockchain node.

It is contemplated that each of the plurality of first security nodes, the at least one second security node, and the at least one third security node register themselves on the blockchain prior to the plurality of first security nodes monitoring at least one of the blockchain and the connected devices for the malicious and good behavior.

It is contemplated that the at least one second security node implements self-learning to generate the at least one of pre-trained detection models and rules.

It is contemplated that the self-learning includes a plurality of neural networks and machine learning algorithms, the machine learning algorithms comprising at least one of a deep learning algorithm, a boosting algorithm, and a bagging approaches algorithm.

It is contemplated that at least one of the pre-trained detection models and rules include cybersecurity artifacts as security vulnerabilities in at least one of a smart contracts and digital assets, in at least one of binary formats and source code formats, malware in at least one of a smart contract, digital assets, end user computers, good/malicious smart contract patterns, good/malicious network attack traffic patterns, good/malicious behavior patterns by traditional blockchain nodes, good/malicious behavior patterns by the plurality of first security nodes, valid/non-valid signatures' patterns of an Internet of Things (IoT) manufacturer that places an IoT security upgrade as a programmable asset on the blockchain, valid/non-valid signature patterns of a network intrusion collaborating party that places a good/malicious network pattern update as a digital asset, a good/innocuous security software upgrade for a connected user equipment, and a vulnerable security software upgrade for the monitored connected devices.

It is contemplated that the monitoring by the first plurality of security nodes includes validating incoming network traffic for malicious attack patterns, validating at least one of programmable digital assets, smart contracts, files, and executables for malware and/or presence of exploits, validating security policy updates for innocuousness, validating an incoming security software upgrade for innocuousness, validating a signature pattern of an Internet of Things (IoT) manufacturer, and validating signature patterns of a network intrusion collaborating party.

It is contemplated that the plurality of first security nodes at least one of each calculate a risk score as a basis to determine if at least one of the monitored blockchain and the monitored connected devices include the malicious behavior, and achieve consensus through an asynchronous Byzantine fault tolerant (BFT) algorithm over the risk score as the basis to determine if at least one of the monitored blockchain and the monitored connected devices includes the malicious behavior.

It is contemplated that the at least one second security node further verifies the risk scores calculated by each of the plurality of first security nodes, identifies a particular risk score associated with a particular first security node as being outside of an accepted risk score range, and informs the at least one third security node that the particular risk score is outside of the accepted risk score range, and that the at least one third security node further blocks or deactivates the particular first security node in response to the particular risk score being outside of the accepted risk score range.

It is contemplated that the plurality of second security nodes achieve consensus to decide whether a particular risk score associated with the particular first security node as being outside of the accepted risk score range.

It is contemplated that the plurality of third security nodes achieve consensus to decide on blocking or deactivating the particular first security node in response to the particular risk score being outside of the accepted risk score range.

It is contemplated that the at least one third security node stores the risk scores calculated by each of the plurality of first security nodes in a security blockchain ledger for use by the at least one second security node to implement self-learning to generate the at least one of pre-trained detection models and rules.

It is contemplated that the plurality of third security nodes achieve consensus as a basis on deciding whether to store the risk scores calculated by each of the plurality of first security nodes in a security blockchain ledger for use by the at least one second security node to implement self-learning to generate the at least one of pre-trained detection models and rules.

It is contemplated that the at least one second security node identifies a particular risk score associated with the plurality of first security nodes as being inside of an accepted risk score range, and informs the at least one third security node that the particular risk score is inside of the accepted risk score range, and that the at least one third security node further decides to reward the plurality of first security nodes for behaving honestly in response to the particular risk score being inside of the accepted risk score range.

It is contemplated that a plurality of the second security node achieve consensus to decide whether the particular risk score associated with a particular first security node is inside of an accepted risk score range.

It is contemplated that a plurality of third security node achieve consensus as a basis to reward the plurality of first security nodes for behaving honestly in response to the particular risk score being inside of the accepted risk score range.

It is contemplated that the at least one third security node further sends a security warning acknowledgement alert to the plurality of first security nodes. In response to the security warning acknowledgement alert, the plurality of first security nodes further send the security warning alert to at least one of a traditional blockchain node and third parties, and in response to the security warning acknowledgement alert, the plurality of first security nodes further block traffic from at least one of malicious connected devices or malicious blockchain node, place vulnerable contracts into quarantine, and perform security configuration updates.

It is contemplated that the system further comprises a security blockchain ledger to store a number of cybersecurity artifacts associated with the malicious and good behavior, the cybersecurity artifacts including a) at least one warning alert to at least one of traditional blockchain nodes and a third party in response to a security breach, b) information about at least one of blocked malicious actors and malicious blockchain nodes, c) information about vulnerable smart contracts placed into quarantine, d) a smart contract with a vulnerability, e) a malicious smart contract, f) a non-malicious smart contract, g) a network traffic anomaly event, h) a non-malicious network event, i) a risk score associated with behavior of a particular first security node from the plurality of first security nodes as being outside of an accepted risk score range, j) a risk score associated with behavior of a particular first security node from the plurality of first security nodes as being inside of an accepted risk score range, k) a signature of an Internet of Things (IoT) manufacturer that places an IoT security upgrade as a programmable asset on the blockchain, l) a signature of a network intrusion collaborating party that places a non-malicious/malicious network patterns update as a digital asset, m) a non-malicious security software upgrade for a connected user equipment, n) a vulnerable security software upgrade for at least one of the monitored connected devices and, o) at least one reward granted to at least one of the first, second and third security nodes for performing a cybersecurity defense for the monitored connected devices.

The disclosure is also directed to a method comprising receiving, by a plurality of first security nodes, at least one of pre-trained detection models and rules, monitor at least one of a blockchain and connected devices for malicious and good behavior based on the received at least one of pre-trained detection models and rules. The method further comprises creating, by at least one second security node, the at least one of pre-trained detection models and rules, communicate the at least one of pre-trained detection models and rules to the plurality of first security nodes, and receive from at least one of the plurality of first security nodes the reported malicious behavior associated with at least one of the monitored blockchain and the monitored connected devices. The method even further comprises informing, by the at least one second security node, at least one third security node of the reported malicious behavior associated with at least one of the monitored blockchain and the monitored connected devices.

It is contemplated that the method further comprises forming, by the plurality of first security nodes, the at least one second security node, and the at least one third security node, a security detection loop, the method implementing a plurality of security detection loops each coupled to a security blockchain ledger, the security blockchain ledger also coupled to at least one of the monitored blockchain and the monitored connected devices.

It is contemplated that the protocol is a consensus protocol, the method further comprising utilizing, by each of the plurality of security detection loops, the consensus protocol to guaranty validity of cybersecurity artifacts before sending warning alerts to at least one of a traditional blockchain node and third parties, add cybersecurity artifacts into a security blockchain ledger, and use the cybersecurity artifacts for training of self-learning detection models.

It is contemplated that the method further comprises for each of the plurality of first security nodes, one of installing on a traditional blockchain node and registering as an independent first security node running separately from the monitored blockchain node.

It is contemplated that the method further comprises registering, by each of the plurality of first security nodes, the at least one second security node, and the at least one third security node, themselves on the blockchain prior to the plurality of first security nodes monitoring at least one of the blockchain and the connected devices for the malicious and good behavior.

It is contemplated that the method further comprises implementing, by the at least one second security node, self-learning to generate the at least one of pre-trained detection models and rules.

It is contemplated that the self-learning of the method includes a plurality of neural networks and machine learning algorithms, the machine learning algorithms comprising at least one of a deep learning algorithm, a boosting algorithm, and a bagging approaches algorithm.

It is contemplated that at least one of the pre-trained detection models and rules of the method include cybersecurity artifacts as security vulnerabilities in at least one of a smart contracts and digital assets, in at least one of binary formats and source code formats, malware in at least one of a smart contract, digital assets, end user computers, good/malicious smart contract patterns, good/malicious network attack traffic patterns, good/malicious behavior patterns by traditional blockchain nodes, good/malicious behavior patterns by the plurality of first security nodes, valid/non-valid signatures' patterns of an Internet of Things (IoT) manufacturer that places an IoT security upgrade as a programmable asset on the blockchain, valid/non-valid signature patterns of a network intrusion collaborating party that places a good/malicious network pattern update as a digital asset, a good/innocuous security software upgrade for a connected user equipment, and a vulnerable security software upgrade for the monitored connected devices.

It is contemplated that the monitoring by the first plurality of security nodes of the method includes validating incoming network traffic for malicious attack patterns, validating at least one of programmable digital assets, smart contracts, files, and executables for malware and/or presence of exploits, validating security policy updates for innocuousness, validating an incoming security software upgrade for innocuousness, validating a signature pattern of an Internet of Things (IoT) manufacturer, and validating signature patterns of a network intrusion collaborating party.

It is contemplated that the method further comprises at least one of calculating, by the plurality of first security nodes, a risk score as a basis to determine if at least one of the monitored blockchain and the monitored connected devices include the malicious behavior, and achieving consensus, by the plurality of first security nodes, through an asynchronous Byzantine fault tolerant (BFT) algorithm over the risk score as the basis to determine if at least one of the monitored blockchain and the monitored connected devices include the malicious behavior.

It is contemplated that the method further comprises verifying, by the at least one second security node, the risk scores calculated by each of the plurality of first security nodes, identifies a particular risk score associated with a particular first security node as being outside of an accepted risk score range, and informs the at least one third security node that the particular risk score is outside of the accepted risk score range, and blocking or deactivating, by the at least one third security node, the particular first security node in response to the particular risk score being outside of the accepted risk score range.

It is contemplated that the method further comprises achieving consensus, by the plurality of second security nodes, to decide whether a particular risk score associated with the particular first security node as being outside of the accepted risk score range.

It is contemplated that the method further comprises achieving consensus, by a plurality of the third security node, to decide on blocking or deactivating the particular first security node in response to the particular risk score being outside of the accepted risk score range.

It is contemplated that the method further comprises-storing, by the at least one third security node, the risk scores calculated by each of the plurality of first security nodes in a security blockchain ledger for use by the at least one second security node to implement self-learning to generate the at least one of pre-trained detection models and rules.

It is contemplated that the method further comprises achieving consensus, by a plurality of the third security node, as a basis on deciding whether to store the risk scores calculated by each of the plurality of first security nodes in a security blockchain ledger for use by the at least one second security node to implement self-learning to generate the at least one of pre-trained detection models and rules.

It is contemplated that the method further comprises identifying, by the at least one second security node, a particular risk score associated with the plurality of first security nodes as being inside of an accepted risk score range, and informs the at least one third security node that the particular risk score is inside of the accepted risk score range, and deciding, by the at least one third security node, to reward the plurality of first security nodes for behaving honestly in response to the particular risk score being inside of the accepted risk score range.

It is contemplated that the method further comprises achieving consensus, by a plurality of the second security node, to decide whether the particular risk score associated with a particular first security node is inside of an accepted risk score range.

It is contemplated that the method further comprises achieving consensus, by a plurality of the third security node, as a basis to reward the plurality of first security nodes for behaving honestly in response to the particular risk score being inside of the accepted risk score range.

It is contemplated that the method further comprises sending, by the at least one third security node, a security warning acknowledgement alert to the plurality of first security nodes, sending, by the plurality of first security nodes, the security warning alert to at least one of a traditional blockchain node, and third parties, in response to the security warning acknowledgement alert, and at least one of, by the plurality of first security nodes, blocking traffic from at least one of malicious connected devices and malicious blockchain nodes, placing vulnerable contracts into quarantine, and performing security configuration updates in response to the security warning acknowledgement alert.

It is contemplated that the method further comprises storing, by a security blockchain ledger, a number of cybersecurity artifacts associated with the malicious and good behavior, the cybersecurity artifacts including a) at least one warning alert to at least one of traditional blockchain nodes and a third party in response to a security breach, b) information about at least one of blocked malicious actors and malicious blockchain nodes, c) information about vulnerable smart contracts placed into quarantine, d) a smart contract with a vulnerability, e) a malicious smart contract, f) a non-malicious smart contract, g) a network traffic anomaly event, h) a non-malicious network event, i) a risk score associated with behavior of a particular first security node from the plurality of first security nodes as being outside of an accepted risk score range, j) a risk score associated with behavior of a particular first security node from the plurality of first security nodes as being inside of an accepted risk score range, k) a signature of an Internet of Things (IoT) manufacturer that places an IoT security upgrade as a programmable asset on the blockchain, l) a signature of a network intrusion collaborating party that places a non-malicious/malicious network patterns update as a digital asset, m) a non-malicious security software upgrade for a connected user equipment and, n) a vulnerable security software upgrade for at least one of the monitored connected devices, 0) at least one reward granted to at least one of the first, second and third security nodes for performing a cybersecurity defense for the monitored connected devices.

It is contemplated that the method further comprises using cybersecurity artifacts, stored on the security blockchain ledger, associated with the malicious and good behavior by the at least one second security node for self-learning to generate the at least one of pre-trained detection models and rules.

BRIEF DESCRIPTION OF THE DRAWINGS

The disclosure will now be described with reference to the drawings wherein.

DETAILED DESCRIPTION OF THE DISCLOSURE

Figure 1:
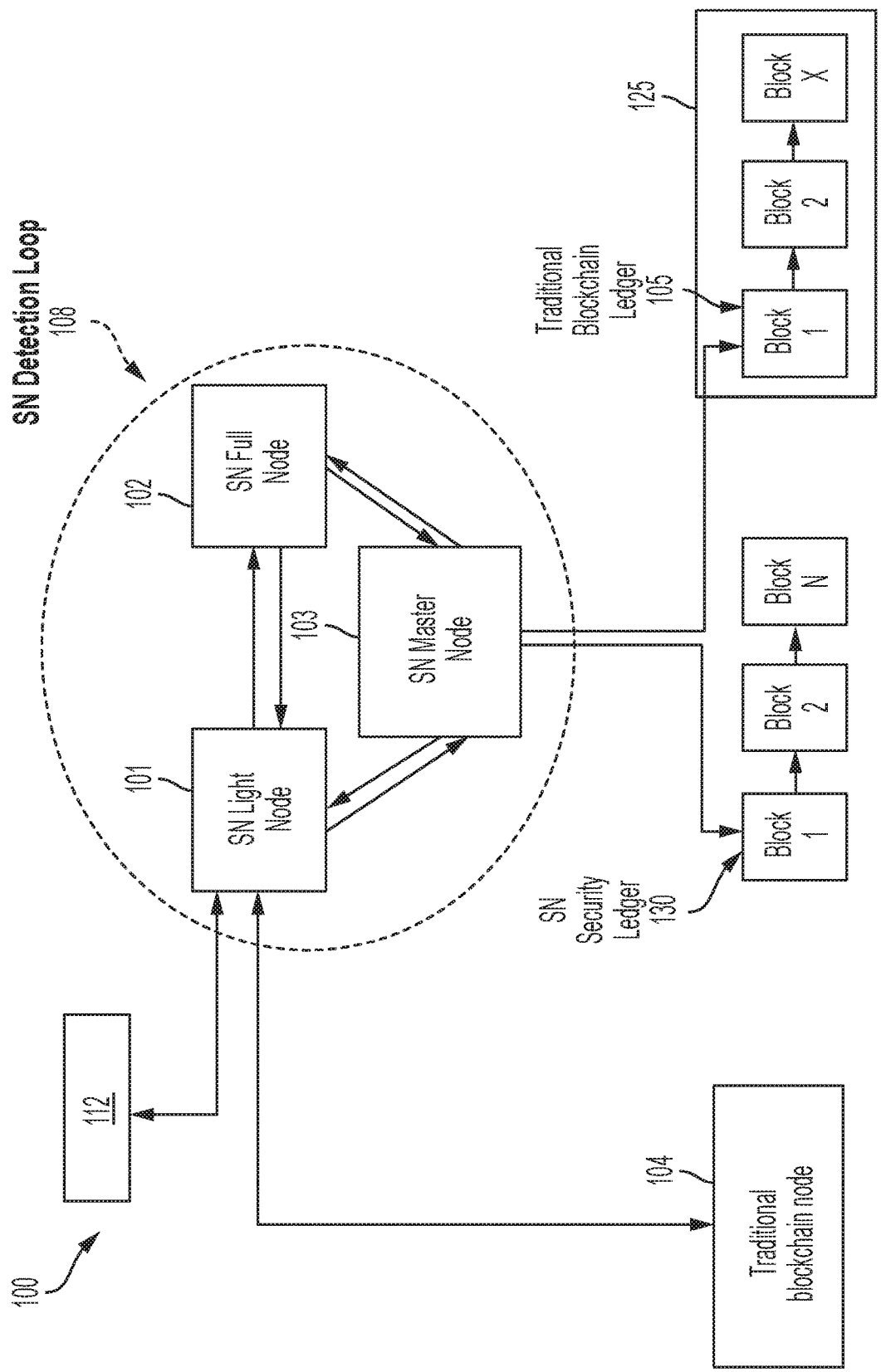
FIG. 1 illustrates example elements of a Security Node (SN) system and its communications, in accordance with the embodiments disclosed herein.

While this disclosure is susceptible of embodiment(s) in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

The current disclosure relates to the security issues of blockchains, distributed ledger technologies and networks of connected devices, such as Internet-of-Things (IoT), drones, etc. Blockchain benefits society in profound and diverse ways, and will become increasingly beneficial as this technology is increasingly used in new ways. By ensuring that value is correctly and safely exchanged between parties, blockchain technology will transform the industries that rely on centralized assurance mechanisms, acting as a powerful, transparent force against corruption. Before this potential can be realized, the disclosed embodiments address and overcome the crucial security limitations that currently exist within blockchain technology development.

The present embodiments solve the limitations discussed above by introducing a fully distributed security system that monitors at least one of a blockchain and connected devices, takes advantages of immutability and auditability properties of the blockchain, assumes compromise by both adversaries and trusted insiders, is programming language agnostic and blockchain technology agnostic, and has a self-learning capability that enables detection of malicious behavior, e.g., zero-days vulnerabilities among others in an automated, scalable way.

The present embodiments disclose a peer-to-peer system, that is a SN system 100, such as a peer-to-peer network of security nodes collectively adhering to a protocol for inter-node communication. This peer-to-peer network of security nodes performs such cybersecurity functions as validating incoming network traffic for malicious attack patterns, validating programmable digital assets/smart contracts/files and executables for malware, and/or exploits presence, validating security policy updates, etc. This peer-to-peer network of security nodes also performs security configuration updates for connected devices, such as Internet-of-Things (IoT), drones, etc., for innocuousness, sending warning alerts to traditional blockchain nodes and/or a third party in response to a security breach, blocking malicious actors, placing vulnerable contracts into quarantine, performing security configuration updates, and writing security results and cybersecurity artifacts into an internal distributed security blockchain ledger and/or a traditional distributed blockchain ledger. Moreover, the secure blockchain technology disclosed herein enables mechanisms to protect and upgrade connected devices in case of an attack. The disclosed peer-to-peer system is "agnostic" regarding network and network programming language, can respond efficiently to current and emerging threat models, including but not limited to zero-day vulnerabilities, can deal with bugs and vulnerabilities in smart contracts in a general way, meaning to uncover them automatically and at scale, and can add a self-improving security feature which is decoupled from a consensus algorithm.

Referring now to the drawings and in particular to FIG. 1, elements of the SN system 100 and its communications is presented. In particular, the SN system 100 includes a SN detection loop 108 that is in communication with a traditional blockchain node 104, a SN security blockchain ledger 130, and a traditional blockchain 125 (e.g., public and/or private) data being monitored that includes a traditional blockchain ledger 105 of the traditional blockchain 125. The SN detection loop 108 includes at least one first security node, such as a SN light node 101, at least one second security node, such as a SN full node 102, and at least one third security node, such as a SN master node 103, each of the nodes 101, 102, 103 being in communication with the other nodes within the SN detection loop 108. The SN security blockchain ledger 130 includes any number of blocks, e.g., blocks 1, 2, . . . N and the traditional blockchain ledger 105 includes any number of blocks, e.g., 1, 2, . . . X. Although a single traditional blockchain node 104, SN security blockchain ledger 130, traditional blockchain ledger 105, SN light node 101, SN full node 102, and SN master node 103 are illustrated and described herein, one of skill within the art would understand that such an illustration and explanation is for simplicity of illustration and explanation only, with the nodes 101, 102, 103, 104 each also representing a plurality of such nodes 101, 102, 103, 104, respectively, where appropriate as discussed below with respect to the embodiments disclosed herein. Thus, at locations throughout where the nodes 101, 102, 103, 104 are described in the singular, such descriptions apply equally to a plurality of such nodes 101, 102, 103, 104.

Figure 3:
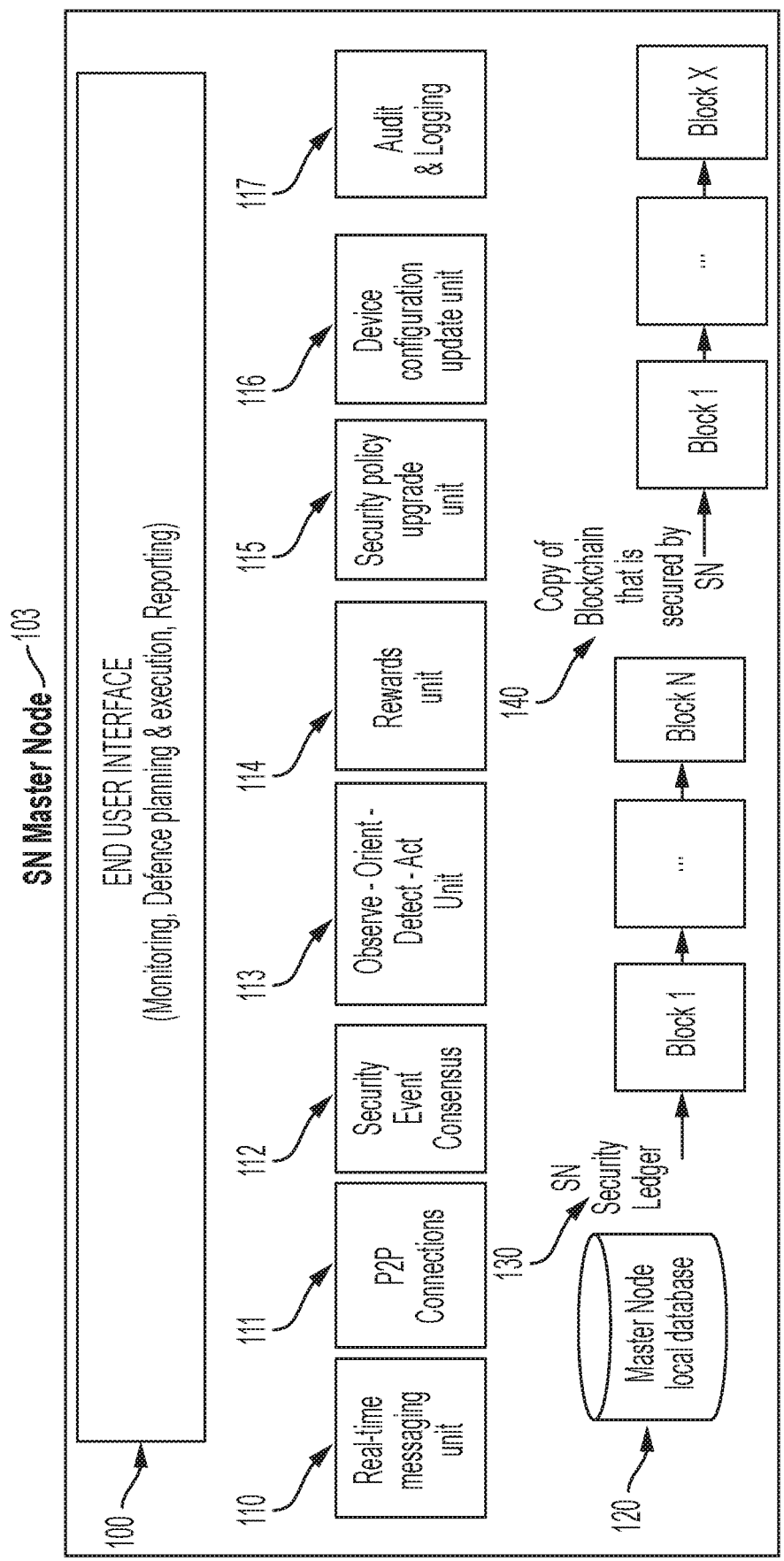
FIG. 3 illustrates an example architecture of a SN master node, in accordance with the embodiments disclosed herein.
Figure 4:
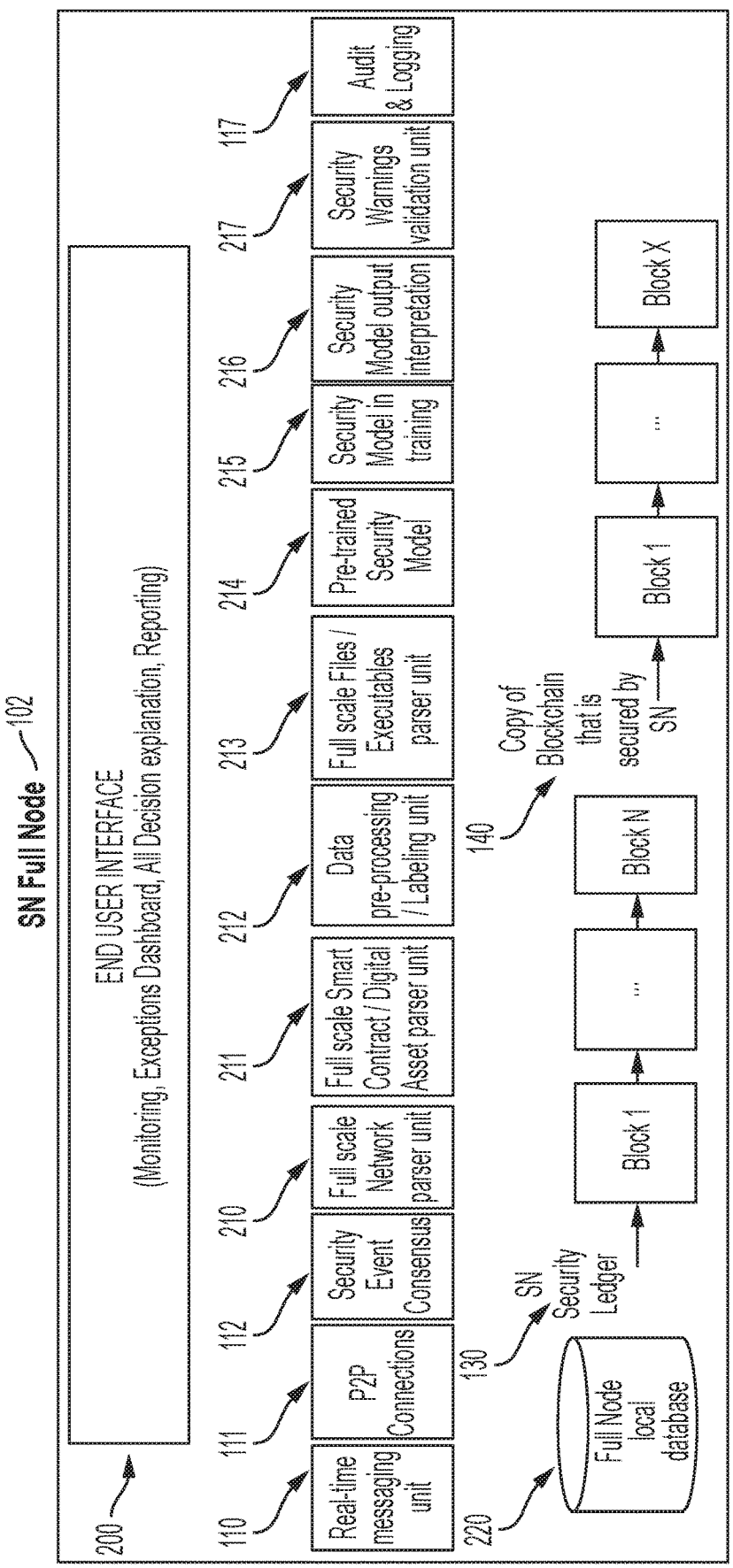
FIG. 4 illustrates an example architecture of a SN full node, in accordance with the embodiments disclosed herein.
Figure 5:
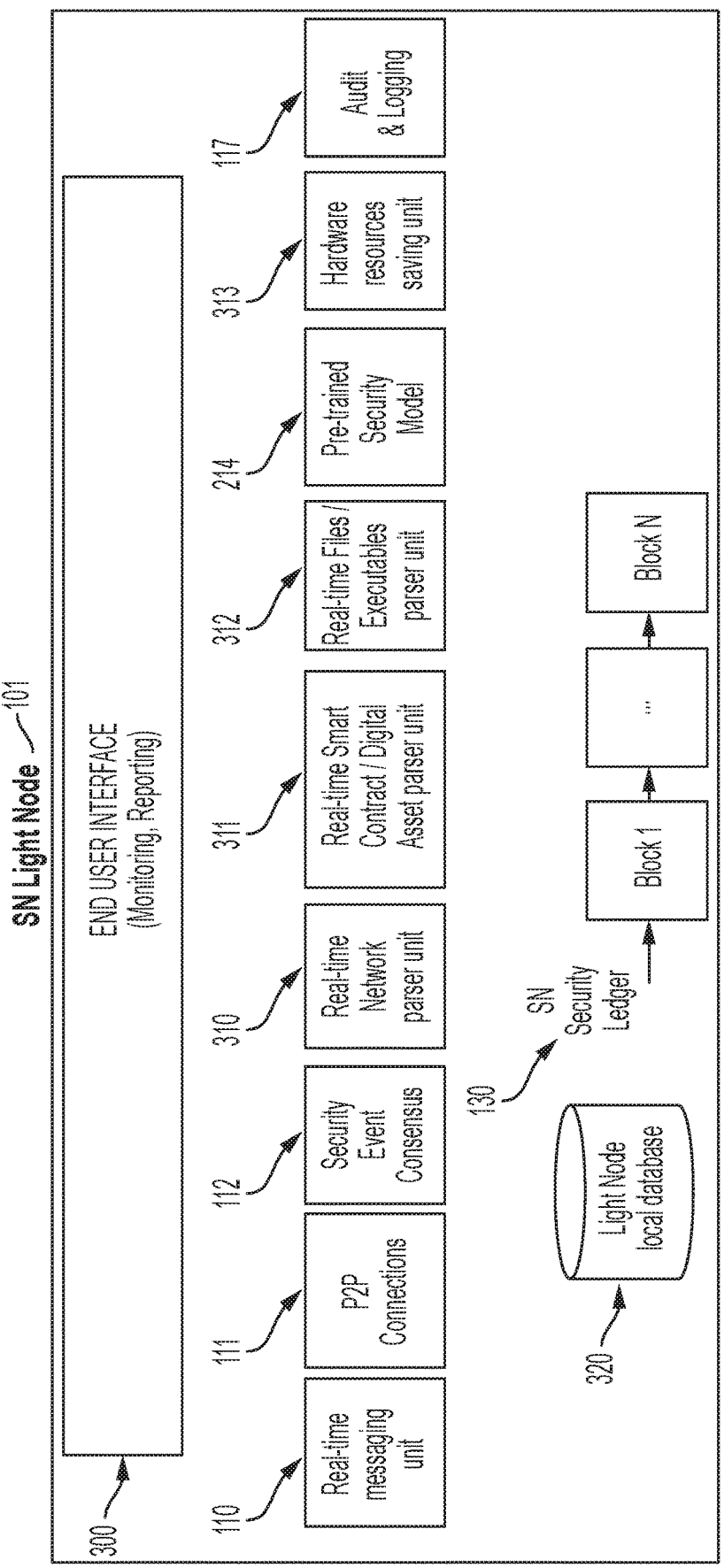
FIG. 5 illustrates an example architecture of a SN light node, in accordance with the embodiments disclosed herein.
Figure 6:
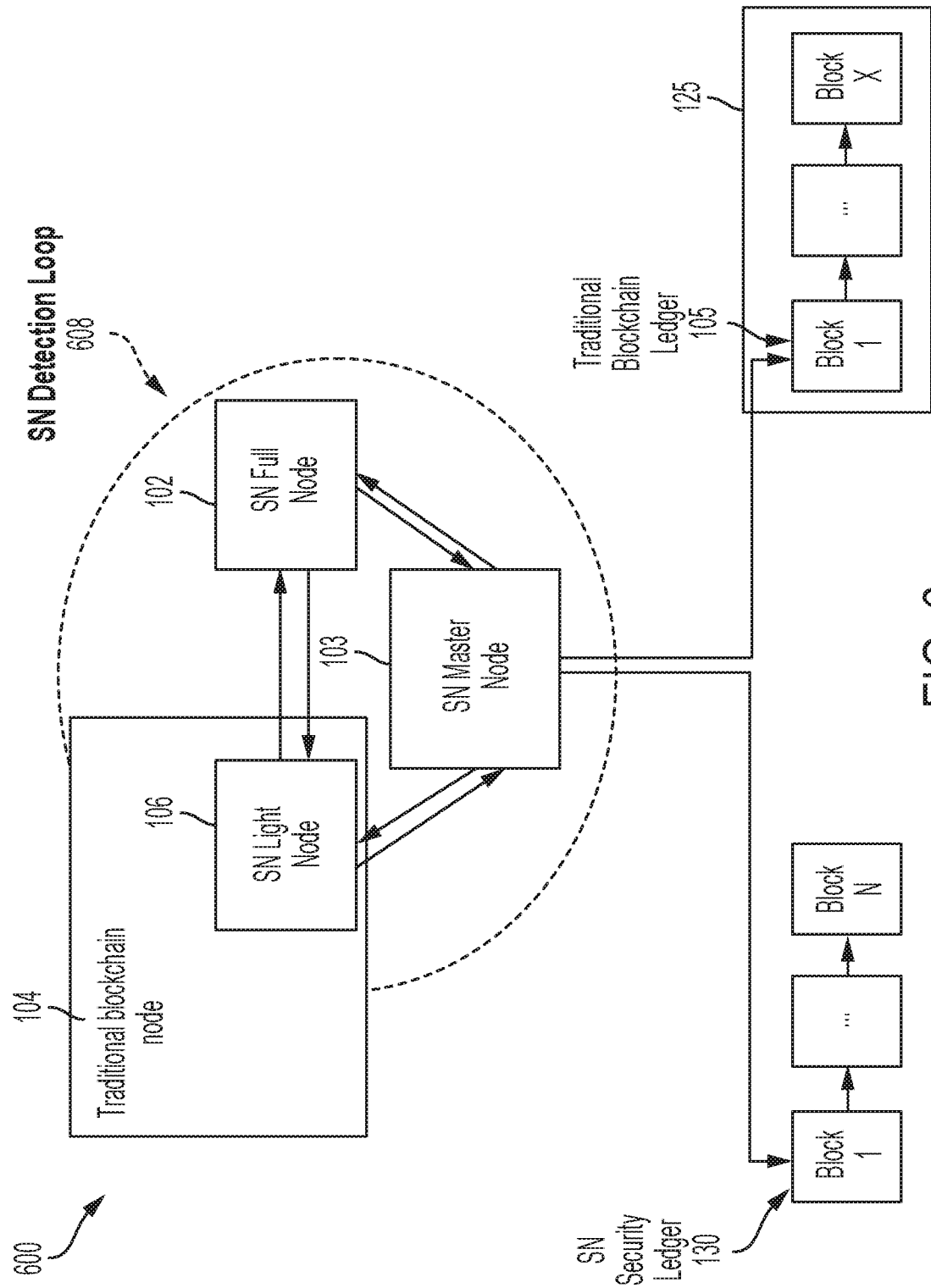
FIG. 6 illustrates an example in which the SN light node is deployed as endpoint protection solution for a traditional blockchain ledger, in accordance with the embodiments disclosed herein.
Figure 7:
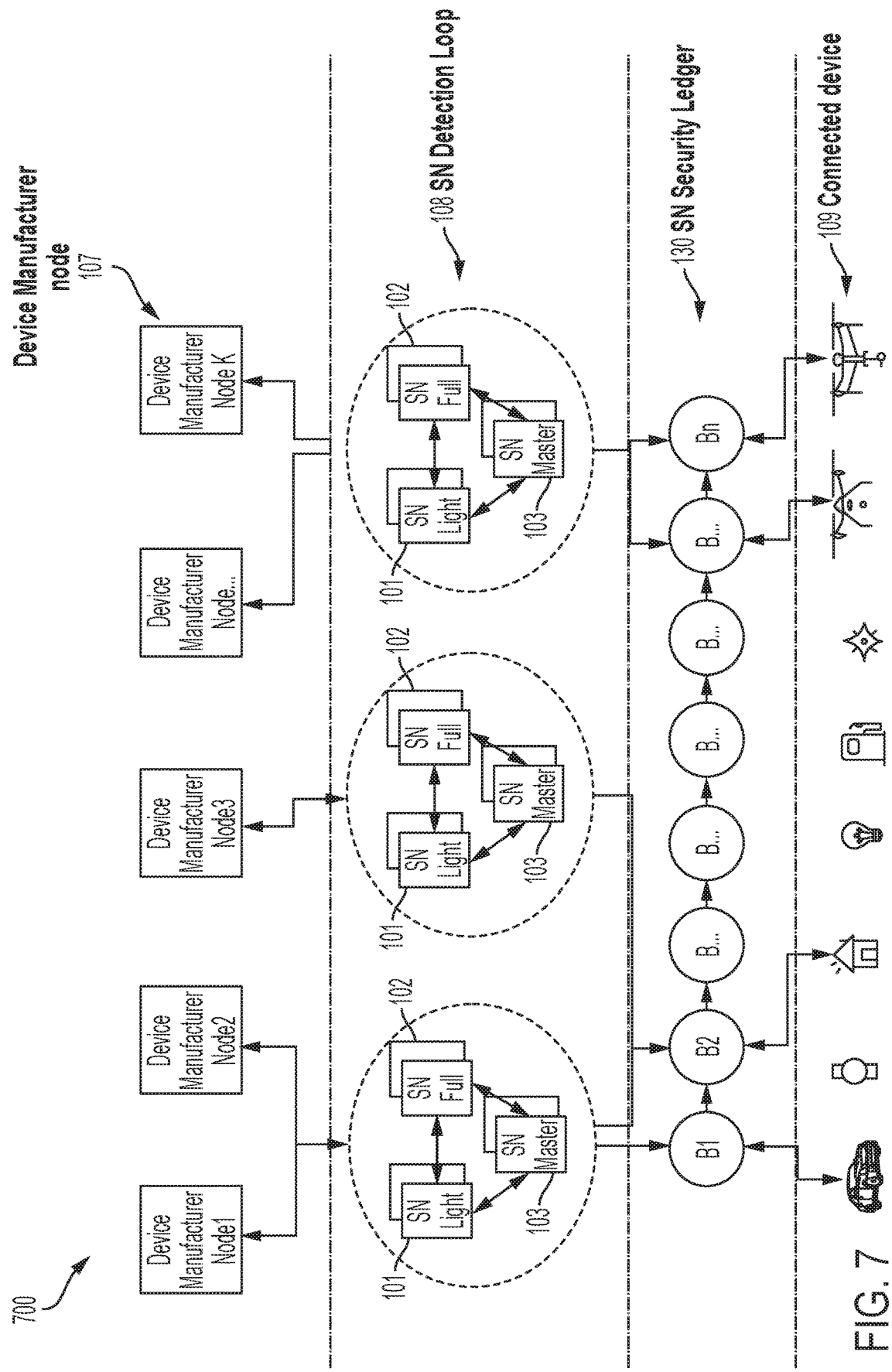
FIG. 7 illustrates an example SN architecture deployed for enabling end-to-end security for connected devices, in accordance with the embodiments disclosed herein.

FIG. 1 will be described in combination with FIGS. 3-7. In particular, FIG. 3 illustrates an architecture of the SN master node 103, FIG. 4 illustrates an architecture of the SN full node 102, and FIG. 5 illustrates an architecture of the SN light node 101. FIG. 7 illustrates an SN architecture 700 deployed for enabling end-to-end security for connected devices, such as IoT, drones, smart devices, etc. In at least one embodiment, the SN full node 102 includes a full scale network parser unit 210, a full scale smart contract and digital asset parser unit 211, and/or a full scale files and executables parser unit 213.

The SN light node 101 acts as a cybersecurity field agent with its main goal being assessing incoming network traffic, smart contracts, and other security relevant data, all in real-time. The SN light node 101 alerts traditional blockchain node 104 and/or 3rd party customers about malicious behavior associated with monitored ledgers in real-time. The SN light node 101 uses pre-trained detection models and/or rules, such as but not limited to deep learning network, other neural networks and machine learning results, and/or prepared rule sets, etc., delivered by the SN full nodes 102 to make an educated judgement about whether incoming traffic, data, and/or smart contracts contain malicious behavior. The SN light node 101 receives traditional blockchain 125 data to be checked and applies all the detection models and/or rules it has gotten from a specific coupled SN full node 102, calculates a risk score to determine if the monitored traditional blockchain 125 data includes malicious behavior, and forwards the risk score together with the checked traditional blockchain 125 data to the corresponding SN full node 102.

For example, the SN light node 101 calculates an individual risk score by applying the pre-trained detection models and/or rules described herein, such as with pre-trained security model 214 (FIG. 5), provided by the connected SN full nodes 102, on the event and the affected traditional blockchain 125 data. The affected data includes but is not limited to a smart contract, a network traffic anomaly event, a signature of IoT manufacturer that places an IoT security upgrade as a programmable asset on the traditional blockchain 125 data, a signature of a network intrusion collaborating party that places a good/malicious network patterns update as a digital asset, and/or a security software upgrade intended by manufacturers to connected device 109 (FIG. 7). This risk score, together with notification of the security event and its associated data, is sent to all connected SN light nodes 101 and the SN full nodes 102, such as via the real-time messaging unit 110 (FIG. 5) of the SN light node 101, to be verified. Alternatively, based on network latency and available hardware resources considerations the risk score and its associated security event data is written on the SN security blockchain ledger 130 (FIG. 5, FIG. 7). In at least one embodiment, only an acknowledgement message about this security event is sent to the SN light nodes 101 and the SN full nodes 102 for verification via the real-time messaging unit 110 (FIG. 5). The SN light nodes 101, contacted with the acknowledgement message, apply their pre-trained detection models on the security event and data, calculate the individual risk score for this security event and its associated data, and communicate this calculated individual risk score to a caller, such as the SN full node(s) 102 and/or SN master node(s) 103.

The SN light nodes 101 can run on low resource underlying hardware, such as a mobile phone or desktop. A plurality of the SN light nodes 101 achieves low-level consensus over a set of mutually agreed cybersecurity alert messages through an algorithm, such as but not limited to an asynchronous Byzantine fault tolerant (BFT) algorithm. This provides an efficient and fault-tolerant consensus over an arbitrarily defective network infrastructure, given a set of mostly benign authorities or the SN light nodes 101. The SN light node 101 acts "honestly" in that the SN light node 101 does not produce false bug/security vulnerability reports and/or attack situations, to receive unearned rewards.

After reaching a consensus, e.g., with a quorum of >66%, the SN light node 101 sends a "malicious" alert. In one or more embodiments, the SN light node 101 may perform one or more of the following actions: provide a real-time alert on malicious behavior by the traditional blockchain node 104, provide a real-time alert to a smart contract holder (not shown), block network traffic from a malicious node, such as the traditional blockchain node 104, place the vulnerable contract/malware into quarantine, e.g., a virtual container. In an embodiment, the block network traffic action and the place the vulnerable contract/malware into quarantine action are only performed if desired by the traditional blockchain 125.

The SN full node 102 sends frequent updates, e.g., hourly, daily, etc., on all incoming network traffic for further training by the SN full node 102. The SN full node 102 sends these frequent updates on a cybersecurity knowledge base learned by networks, such as but not limited to neural networks, in the format of pre-trained detection model and/or rule results. After the SN full node 102 reaches a consensus on malicious behavior, it sends updates on traffic identified as malicious and contracts identified as vulnerable.

The SN full node 102 acts as a cybersecurity lab with three main goals: training the SN underlying software on existing and emerging vulnerabilities and complex attack strategies, validating and verifying alerts that have achieved consensus amongst a plurality of the SN light nodes 101, and working as a distributed cyber security server for those SN light nodes 106 (FIG. 6), operating as end point cyber security agents on the machines of traditional blockchain nodes 104. The SN full node 102 maintains a "Full Node" copy of the traditional blockchain 125 as well as the latest version of the cybersecurity knowledge database, meaning that the SN full node 102 retains all necessary information to be able to author and communicate a new version of an attacks & vulnerabilities specification to the SN light node 101, in form of a detection model, rule set, or other proper formats. For implementing the self-learning capabilities of the SN full node 102, proper machine learning approaches are used, such as but not limited to Deep Neural Networks, Ensemble Methods, etc.

The SN system 100 determines distributed consensus to identify malicious behavior. In at least one embodiment, the SN full nodes 102 uses a Proof of Stake (PoS) based consensus to decide whether malicious behavior consented by the SN light node 101 has occurred, or not. This is important for fair reward distribution. For example, in the case of a sybil attack, an attacker can attack malicious SN light nodes 101 that are part of an attacker's network and those SN light nodes 101 will alert the traditional blockchain node 104 that it has received an undeserved incentive.

Hardware requirements for the SN full node 102 are similar to those for "full nodes" in present-day blockchain systems, e.g., GPU enabled infrastructure. The SN full node 102 posts only a small bond. This bond prevents sybil attacks from wasting other SN full nodes' 102 time and computing resources. The bond is immediately withdrawable after reaching consensus on whether malicious behavior, as reported by the SN light node 101, is confirmed.

As discussed above, the SN full node 102 communicates with the SN master node 103. After reaching consensus on whether malicious behavior reported by SN light nodes 101 actually happened, the SN full node 102 sends proof as a basis for rewards to the SN master node 103 (FIG. 1), 103

(FIG. 6), 103 (FIG. 7). The SN full node 102 also provides a latest version of self-learned cybersecurity knowledge base to SN light nodes 101.

The SN master node 103 is the highest-level node within the SN system 100 and the mastermind within the SN system 100. The SN master node 103 performs coordination during emergencies, organizes recovery of the SN system 100 from an attack, and acts as a main authority for reward distribution and distributes such rewards. The SN master node 103 decides on an emergency plan in the event of a cybersecurity threat and notifies the SN full nodes 102 and SN light nodes 101 about new peers that become available, respectively.

In at least one embodiment, the role of the SN master node 103 is contingent upon a sufficiently high bond being deposited, though other bonded parties are allowed to nominate one or more SN master nodes 103 to act for them and as such some portion of the bond of the SN master node 103 may not necessarily be owned by the SN master node 103 itself, but rather by SN token stakeholders. The SN master node 103 executes a full copy of a specific blockchain, such as the traditional blockchain 125, plus the latest copy of the cybersecurity knowledge base, e.g., the pre-trained detection models and/or rules, delivered by one or more of the SN full node 102, with high availability and bandwidth. The SN master node 103 monitors availability of the SN light node 101 and the SN full node 102, and checks alerts and decides on recovery operations. In at least one embodiment, the SN master node 103 is also a final authority on deciding whether an individual SN light node 101 or a group of SN light nodes 101 acted honestly and therefore deserve a reward or if they are blocked in case of malicious activities. In at least one embodiment, the SN master node 103 will be elected through a Delegated Proof-of-Stake (DPoS) scheme.

The SN master node 103 reports on online availability and sends alerts on malicious behavior. In at least one embodiment, the SN full node 102 identifies the SN light node 101 as 'malicious' and the SN master node 103 blocks the malicious SN light node 101, preventing the SN light node 101 from being used on communication channels within the SN system 100 thereafter, such as from accessing the traditional blockchain ledger 105.

The SN master node 103 writes attackers' data on traditional blockchains, such as the traditional blockchain 125. In at least one embodiment, only basic detail about an attacker is written, without the attacker's strategy which will be available upon request by reputable 3rd parties.

In at least one embodiment, all the SN nodes 101, 102, 103 communicate with each other via a custom SN protocol, that is a SN protocol that is not otherwise in existence at the time of that such SN protocol was created. To ensure efficient transport and peer communication, this custom SN network protocol includes an extensible peer selection and discovery mechanism accompanied by peer availability monitoring and peer planning to ensure that enough SN nodes of different types are connected at the right time. The custom SN protocol takes into consideration and extends already existing peer-to-peer protocols, such as but not limited to libp2p and GNU's GNUnet.

The described communications between SN nodes 101, 102, 103 enables the SN detection loop 108 to defeat a malware update loop of bad actors and further enables the SN light node 101 to continuously monitor the blockchain network, such as the SN system 100, while eliminating dangerous gaps in security coverage. The SN detection loop 108 is designed in accordance with the known Observe-Orient-Detect-Act loop (OODA-loop).

There are three major phases or processes regarding processes performed by the SN nodes 101, 102, 103: an initialization process in which the SN nodes 101, 102, 103 are initialized, a monitoring process in which security of the traditional blockchain 125 operations are assured, and a training process to automatically create and adapt detection models and/or rules utilized by the SN light nodes 101.

The initialization process assures a proper set-up of a SN secure node layer and includes example processes. For example, the SN master nodes 103 are started on the traditional blockchain 125 to be secured, registering themselves as 'Master Nodes'. After registration, the SN master nodes 103 are in 'operative mode' which means they are ready to be connected with other SN nodes 101, 102, 103 and the traditional blockchain nodes 104. An operative SN master node 103 accepts connection requests from the SN full nodes 102 and the SN light nodes 101, such as by using real-time messaging unit 110 (FIG. 3) and P2P Connections 111 (FIG. 3) of the SN master node 103.

The SN full nodes 102 are started on the traditional blockchain 125 to be protected, registering themselves as 'Full Nodes'. During this registering process, the SN full nodes 102 scan for near-by available SN master nodes 103 and establish a connection using Real-time messaging unit 110 (FIG. 4) and P2P Connections 111 (FIG. 4). When the SN full node 102 establishes a connection with at least one SN master node 103, the registration is finished successfully and the SN full node 102 switches into the 'operative mode'. An operative SN full node 102 accepts connection requests from the SN light nodes 101 and one or more SN master nodes 103.

The SN light nodes 101 are started on the traditional blockchain 125 to be protected, registering themselves as 'Light Nodes'. The SN light node 101 can be deployed either as a separate blockchain node, as shown in FIG. 1, or as a security plugin of an existing, traditional blockchain node 104, as shown in more detail in FIG. 6. During this registration process, the SN light node 101 first scans for near-by SN full nodes 102 and SN master nodes 103 and establishes communications with at least one SN full node 102 and at least one SN master node 103, such as via real-time messaging unit 110 (FIG. 5) and P2P Connections 111 (FIG. 5). Establishing a communication between the SN light node 102 and the SN full node 102 successfully also includes transferring of pre-trained detection models, e.g., malware models, security exploits, such as with pre-trained security model 214 (FIG. 5). The term "pre-trained malware detection models" refers to not only malware detection models, but also security exploit detection models, network attack pattern model, "bad actors" detection models, infrastructure attacks detection models, etc. In at least one embodiment, the pre-trained security model 214 (FIG. 5) is optimized for different types of SN light nodes 10, e.g., underlying hardware with different hardware resources budgets, such as but not limited to energy consumption, latency, available processing power, such as via hardware resources saving unit 313 (FIG. 5).

In at least one embodiment and after having established the minimal communications described above, the SN light nodes 101 scan for other SN light nodes 101 to establish a connection for the consensus protocol described above, such as via real-time messaging unit 110 (FIG. 5) and P2P Connections 111 (FIG. 5). After having established communications with a minimal number of SN light nodes 101, the SN light node 101 establishing such communications is ready for operation. In at least one embodiment, the minimum number is predefined. As long as this minimal number of communications with other SN light nodes 101 is not reached, the SN light node 101 runs in 'stealth mode' which means that the SN light node 101 is not ready for monitoring but continues to scan for other available SN light nodes 101.

In at least one embodiment after established communications with a predefined number of other SN light nodes 101, the SN light nodes 101 start a discovery process to connect to the traditional blockchain node(s) 104 that are to be secured by the SN security layer, such as via Real-time messaging unit 110 (FIG. 5) and P2P Connections 111 (FIG. 5). In at least one embodiment, the real-time messaging unit 110 (FIG. 3) and P2P Connections 111 (FIG. 5) contain P2P messaging protocols used by traditional blockchains, such as the traditional blockchain 125, for discovering and connecting to the traditional blockchain nodes 104.

Thus, the SN light node 101 remains in 'stealth mode', scanning for other SN light nodes 101 to establish the communications used for implementing the consensus protocol. When an available partner SN light node 101 is identified, this connection is established. By reaching the minimal number of communications with other SN light nodes 101, the SN light node 101 switches into an 'operative mode' and is ready for monitoring blockchains, such as the traditional blockchain 125, for cybersecurity threats. In at least one embodiment, the SN light node 101, in operative mode, accepts connection requests from other SN light nodes 101 as long as a predefined maximal number of communications is not exceeded.

At the end of this initialization process, the SN detection loop 108 (FIG. 1, FIG. 6, FIG. 7) includes a plurality of SN light nodes 101, at least one SN full node 102, and at least one SN master node 103, and any number of traditional blockchain nodes 104, the available number of possible communications are identified by a blockchain itself, is ready for the monitoring process described herein. All activities of all SN nodes 101, 102, 103 and interactions among these SN nodes 101, 102, 103 and the traditional blockchain nodes 104 are logged, such as by an audit & logging unit 117 (FIG. 3, FIG. 4, FIG. 5). Audit & logging data, P2P communications data, real-time messaging data, and data for other units or components illustrated in FIGS. 3, 4 and 5 may be in full or partially stored in a light node local database 320 (FIG. 5), a full node local database 220 (FIG. 4), and a master node local database 120 (FIG. 3), respectively.

During the monitoring process, a successfully initialized SN detection loop 108 (FIG. 1, FIG. 6, FIG. 7) applies its self-adaptive security features on traditional blockchain 125 activities and data. For example, the SN light node 101 identifies an event to be monitored on the traditional blockchain 125, such as via real-time network parser unit 310 (FIG. 5) and/or via real-time smart contract/digital asset parser unit 311 (FIG. 5). The SN light node 101 calculates the individual risk scores, as discussed above.

The contacted SN full nodes 102 verify the communicated results, that is the communicated calculated individual risk score received from one or more of the SN light nodes 101, on the basis of the pre-trained detection models the SN full nodes 102 provided to the specific, calling SN light node 101. In at least one embodiment, this verification happens via a security warnings validation unit 217 (FIG. 4) and pre-trained security model 214 (FIG. 4). In the event that this verification process leads to a different risk score, that is outside of accepted risk score ranges, the caller SN light node 101 is classified as a potential 'bad actor' and the SN full node 102 informs the SN master node 103 on this issue, such as via a real-time messaging unit 110 (FIG. 4), which may lead to a blocking or deactivation of the malicious SN light node 101. In the event that the risk assessment is inline, that is the risk score is consistently or substantially consistently calculated, the SN full node(s) 102 informs the SN master node(s) 103 that the specific SN light node 101 is classified as trustable and this security event is classified as a "bad" code, actor, and/or attack pattern. Alternatively, a plurality of SN full nodes 102 reach consensus whether an event risk score is within accepted risk score ranges and/or the reporting SN light node 101 is a "good" or "malicious" actor before reporting this result to SN master node 103. In an example, the SN full node(s) 102 reaches consensus via security event consensus 112 (FIG. 4).

The communicated security event data and risk scores are stored in the SN security blockchain ledger 130 as training material for the automated learning process discussed herein, such as applied by a security model in training 215 (FIG. 4), within the training phase. In at least one embodiment, the SN master node 103 stores such communicated security event data and risk scores in the SN security blockchain ledger 130. In at least one embodiment, the communicated security event data and risk scores go through a data pre-processing and labeling unit 212 (FIG. 4) for further usage by the security model in training 215 (FIG. 4).

Receiving the risk scores from the other connected SN light nodes 101, the caller node, such as the SN full node 102, checks if at least a supermajority, e.g., >66%, of the other SN light nodes 101 have come to the same conclusion/risk score assessment, such as by reaching low-level consensus using security event consensus 112 (FIG. 5). After getting the consensus from connected SN master nodes 103, such as by reaching consensus using security event consensus 112 (FIG. 3), the SN light node 101 informs the traditional blockchain node(s) 104 about its risk assessment, such as via real-time messaging unit 110 (FIG. 5).

Thus, the interactions between the SN light nodes 101, the SN full node(s) 102, and the SN master node(s) 103 enable the SN detection loop 108 to defeat a malware loop of bad actors. Thus, the interactions between the SN light nodes 101, the SN full node(s) 102, and the SN master node(s) 103 further enable the SN light nodes 101 to secure the blockchain network, such as the SN system 100, by continuously monitoring and eliminating dangerous gaps in security coverage. The SN master node(s) 103 monitors and analyzes all interactions of the SN light nodes 101, such as via an observe-orient-detect-act unit 113 (FIG. 3). The SN system 100 includes interactions that are not limited to observing availability of SN nodes 101, 102, 103, observing security events, orienting about potential attack vectors, malicious nodes, e.g., the SN light nodes 101 and/or traditional blockchain nodes 104, detecting attacks, acting by blocking "bad" traffic, "bad" actors, placing into/releasing from quarantine the smart contracts and/or digital assets with security exploits and/or malware, deciding on security policy upgrades, initiating an upgrade of a particular SN light node 101 and/or SN full node(s) 102, deciding on signing a IoT manufacturer configuration upgrade as secure, writing security results into the SN security blockchain ledger 130 (FIG. 3), and traditional distributed ledger/blockchain 140 (FIG. 3).

Based on observed interactions by the SN master node(s) 103 discussed above, in at least one embodiment the SN master node(s) 103 performs healing on affected malicious processes executing on the SN light nodes 101, such as by generating configuration updates via a security policy upgrade unit 115 (FIG. 3). The affected SN light node 101 applies a security configuration update generated by the SN master node 103, and in at least one embodiment while keeping continuously monitoring the blockchain network, such as the SN system 100.

Based on SN full node 102 evaluation results described above, in at least one embodiment the SN master nodes 103 issues an acknowledgement message, such as via the real-time messaging unit 110 (FIG. 3), to a connected device, such as but not limited to an IoT device, drone, and/or connected device manufacturer that a particular connected device configuration update placed by device manufacturer is validated and is secure to be applied. For example, the SN master Node 103 writes a configuration update, such as via a device configuration update unit 116 (FIG. 3) into the SN security blockchain ledger 130 (FIG. 3).

In at least one embodiment, when the SN light nodes 101 and the SN full nodes 102 act honestly and protect a blockchain, such as the traditional blockchain 125, in question in a professional manner, the SN master node(s) 103 issues a reward, such as via rewards unit 114 (FIG. 3). In at least one embodiment, limited or all activities of the SN nodes 101, 102, 103 are logged for future audit, such as via an audit & logging 117 (FIGS. 3, 4, 5). In at least one embodiment, the SN light node 101 is equipped with an end user interface 300 (FIG. 5). This SN end user interface 300 provides the following, but not limited to, functions: visualization of all connections/communications (e.g., both with other SN nodes 101, 102, 103 and traditional blockchain nodes 104) and messaging (e.g., incoming messages, sent messages) in real-time, as well as reporting functions.

In at least one embodiment, the SN full node 102 includes an end user interface 200 (FIG. 4). This SN end user interface 200 provides the following, but is not limited to, functions: visualization of all connections/communications (e.g., both with other SN nodes 101, 102, 103 and the traditional blockchain nodes 104), messaging (e.g., incoming messages, sent messages) in real-time, an exceptions dashboard (e.g., events classified as attack alerts with different risk scores), an Artificial Intelligence (AI) decision explanation board (e.g., explaining why a detection model classified a particular observed event as "good" or "malicious"), as well as reporting functions. In at least one embodiment, data visualized on AI decision explanation board is prepared via a security model output interpretation 216 (FIG. 4).

In at least one embodiment, the SN master node 103 is equipped with an end user interface 100 (FIG. 3). This end user interface 200 provides the following, but not limited to, functions: visualization of all connections/communications (e.g., both with other SN nodes 101, 102, 103, and the traditional blockchain nodes 104), messaging (e.g., incoming messages, sent messages) in real-time, defense planning & execution dashboard, and reporting.

Training Process

The SN full nodes 102 conduct the training process automatically to provide pre-trained detection models to the SN light nodes 101. The creation of these pre-trained detection models is based on AI approaches including, but not limited to, supervised and unsupervised machine learning techniques and proper training data. This training data is provided (i) as events, data, etc. by the SN light nodes 101 along their communication channels, (ii) events, data, etc. obtained by the SN full nodes 102 by connecting directly to a secured blockchain, such as the traditional blockchain 125, and (iii) as external data (e.g. labeled samples from the community) by an administrator of the SN full node(s) 102. Events and data obtained by the SN light nodes 101 for training purposes undergo initial processing, such as via real-time network parser unit 310 (FIG. 5) and/or real-time smart contract/digital parser unit 311 (FIG. 5). Events and data obtained by the SN full nodes 102 for training purposes undergo initial processing, such as via full scale network parser unit 210 (FIG. 4) and/or full-scale smart contract/digital parser unit 211 (FIG. 4).

The pre-trained detection models are learned for different kinds of security relevant traditional blockchain 125 artifacts in different contexts, including but not limited to smart contracts as malware, smart contract/digital assets vulnerabilities in code, blockchain software vulnerabilities in code, network traffic analysis, security software upgrades, security policy upgrades, etc., and their mutual interactions.

The training process for external data, such as a ledger(s) that is being monitored by the SN light nodes 101, works as follows:

The training process is initialized by providing labeled samples of the artifacts, e.g. smart contracts labeled as a 'good' contract or a 'bad' contract, source code functions labeled as "good" or "vulnerable" based on syntax and/or semantics vulnerabilities, network traffic labeled as "good" or "bad" etc. for which the detection model has to be learned, are provided to the SN full node 102. In at least one other embodiment, source code vulnerable functions can be labeled based on the type of security exploit and its severity. In an example, the labeled samples are provided via the data pre-processing and labeling unit 212 (FIG. 4). In an example, the labeled samples are stored in the full node local database 220.

The SN full node 102 conducts an automated feature synthesis process for creating an optimal set(s) of predictors, based on proper machine learning techniques, such as but not limited to deep learning, ensemble techniques, and/or classical approaches, e.g., via Security Model in training 215 (FIG. 4). Based on these optimal set of predictors proper efficient prediction models are learned by applying machine learning approaches, such as but not limited to deep learning. The performance of the prediction models is determined by state-of-the art approaches, such as k-Fold-Cross Validation. The performance of the just learned prediction model is compared to a currently active prediction model which is being used by the SN light nodes 101, such as via pre-trained security model 214 (FIG. 5). If the new model shows better performance than the current model, the current model is archived and the new model is converted into a proper transformation format, such as but not limited to Predictive Model Markup Language (PMML), Portable Format for Analytics (PFA), and stored as the current prediction model. On the basis of this process, a dynamic approach is provided.

As an example of training the prediction model of the SN system 100 against different network attack types for PoW based blockchain, a framework is used that consists of four key elements: (i) a blockchain instance, (ii) the SN detection loop 108, (iii) a simulated network of nodes (not shown) with variable number of nodes, and (iv) a live victim node (not shown) running on a production blockchain, such as the traditional blockchain 125. At the time of initial training, the blockchain instance is a Proof of Work (PoW) blockchain instantiated with a given set of consensus and network parameters, such as network delays, block generation times, block sizes, and information propagation mechanisms. The SN full node 102 is trained based on concepts described herein. The simulated network of nodes includes a variable number of attacker nodes and victim nodes. The live victim node is used to test accuracy metrics of the trained SN. A SN training feature set contains output from the blockchain instance and network packet level features dataset, that includes but is not limited to network protocol (Internet Protocol (IP), Transmission Control Protocol (TCP), User Datagram Protocol (UDP)), source IP address, source port of machine, destination port of machine, network service on the destination (e.g., Hypertext Transfer Protocol (HTTP), telnet, etc.), number of data bytes flowing from a source to a destination, number of data bytes flowing from destination to source, frame number, length of the frame, captured frame length, header length of a packet, fragment offset value, time to live, sequence number, congestion window record, explicit congestion notification, max segment size from source to destination requested, max segment size from destination to source requested, time to live length from source to destination, time to live length from destination to source, status of the connection, number of frames received by unique destination in the last T sec from the same source, number of frames received by unique source in the last T sec to the same destination, number of frames from the source to the same destination port in the last T sec, number of frames from destination to the same source port in the last T sec, number of pushed packets flowing from source to destination, number of pushed pkts flowing from destination to source, number of frames to unique destination in the last N packets from the same source, number of frames from unique source in the last N packets to the same destination, etc.

At least one output of the traditional blockchain 125 instance is the measured stale or simulated stale (e.g., orphan) block rate, which is fed as input (one of the features) into the SN light node 101. Additionally, for the blockchain instance and as the SN training feature set, parameters featured by existing deployments are captured and adjusted, such as:

Block interval distribution, such as time to find a block;
Mining power distribution of the miners, such as PoW power distribution;
Block size distribution, such as variable transaction load;
Number of reachable network nodes, such as Open TCP port nodes;
Geographic distribution of nodes, such as worldwide distribution;
Geographic mining pool distribution, such as worldwide distribution;
Number of communications per node, such as within network;
Number of communications of the miners, such as within network;
Block request management system, such as possible protocols;
Standard mechanism, such as inv/getdata;
Unsolicited block push, such as miner only push block;
Relay network;
Minimal double-spending value, such that is strictly larger than the honest mining reward, e.g., calculated based on other input parameters; and
Honest mining reward, such as calculated based on other input parameters.

To test an accuracy of the SN training results, simulated network nodes are tasked to attack live blockchain victim nodes. Each victim node is modified to not send node information in its neighbor messages, such modification preventing spamming a production blockchain network with simulated attackers' data.

Advantages of the SN system 100 disclosed herein include:

Add-On Security—for securing legacy blockchains easily: The secure node solution described herein which includes the SN light node 101, the SN full node 102, the SN master node 103, their communication channel, and a distributed security blockchain ledger are a security layer, which can be plugged-into any existing blockchain, such as the traditional blockchain 125, or a distributed ledger. This plugging-in is implemented by establishing a light-weight communication between the SN light nodes 101 and the SN master nodes 103 with the traditional blockchain 125. Furthermore, the SN light nodes can be deployed as (i) part of a traditional node, such as traditional blockchain node 104, or (ii) as a separate node that supports the features disclosed herein. The SN system 100 is a distributed, fine grained security solution which can be added to any existing distributed ledger or blockchain technology. Furthermore, the SN system 100 is also agnostic concerning programming-languages used. This allows securing of any existing blockchain, on a network and smart contract level, with minimum efforts and without decreasing the scalability of the traditional blockchain 125 being secured.

Dedicated Security Layer—for providing complex security mechanism efficiently: The SN system 100 provides a security mechanism decoupled from the consensus algorithm of the underlying traditional blockchain 125. As a result, technical dependencies are reduced which allows deployment of more advanced security mechanisms. The security of traditional blockchain 125 artifacts is assured by the SN light nodes 101 as supported by the SN full nodes 102. This provides a separate security layer, decoupled from traditional blockchain concepts and processes.

Distributed 2-Layer Security—for implementing a performant and powerful shield: Security checks concerning smart contracts, transactions, network traffic, etc. are distributed over a set of SN light nodes 101 and SN full nodes 102 which assures higher efficiency and improved security. While the SN light nodes 101 are performing checks on precalculated rules, the SN full nodes 102 verify these results on basis of a separate validation in a subsequent step. This two-stage process assures that when the SN light node 101 is acting maliciously it is identified and will be blocked by the SN master node 103. This feature is implemented by the SN light nodes 101 which perform the traditional blockchain 125 checks and the SN full nodes 102 which provide pre-trained models to the SN light nodes 101.

Fully Distributed Security Layer—in comparison to a centralized cloud base security solution, the SN system 100 utilizes a fully distributed security layer that has no single point of failure. For example, in the event that some of the SN light nodes 101, SN full nodes 102 and/or SN master nodes 103 are compromised or offline, others will continue operating un-compromised, as there is no centralized server in command of security of the traditional blockchain 125. Moreover, the SN system 100 assumes both adversaries and trusted insiders. The SN system 100 is designed to defend the traditional blockchain 125 in an adversary trustless cyber environment.

Self-Improving Security—for rising security, and for reducing risks and costs: The SN light nodes 101 apply models or rules to check smart contracts, traffic, etc., the models or rules being provided by the SN full nodes 102 on the basis of transmitted data and existing/historical traditional blockchain 125 information. The SN full nodes 102 apply proper machine learning algorithms, such as but not limited to a deep learning algorithm(s), a boosting algorithm(s), a bagging approaches algorithm, etc., to derive efficient detection models from data automatically. As this 'learning' is an automated ongoing process, security capabilities of the SN system 100 are self-improving over time without requiring user input. The SN full nodes 102 provide this feature during the training phase described above which create new models and/or rules for the traditional blockchain 125 security implemented by the SN light nodes 101.

Energy Saving—for reducing the impacts of the SN system 100 and traditional blockchain 125 to the environment and to lower energy costs: The SN system 100 decouples traditional blockchain 125 security from a costly consensus algorithm of the traditional blockchain 125 in combination with efficient checks of the SN light nodes 101, energy consumption of the SN system 100 for guaranteeing secure activities on the traditional blockchain 125 is reduced. The saving of energy is achieved by (i) decoupling security from consensus mechanism of traditional blockchains and (ii) by using pre-trained detection models at SN Light Nodes which allows to deploy SN Light Nodes on low energy hardware.

End-to-End Security for Blockchain for connected devices—for enabling secure operations for the connected devices 109, such as IoT, drones etc. The advantage here is three-fold: Enabling timely security policies and legitimate signed—software configuration upgrades based on the recent known attacks and exploits against connected devices, providing a security distributed ledger with greater resistance to availability threats, such as DDos, than a manufacturer's infrastructure, and enabling a secure traditional blockchain 125 for connected devices 109 (FIG. 7) since the SN detection loop 108 learns to protect SN security blockchain ledger 130 based on experience and data protecting traditional public and private blockchains. The SN detection loop 108 supports end-to-end security audit and verification prior to security policy upgrade or software upgrade of the connected devices. The SN security blockchain ledger 130 provides a tamper-free proof of the performed security audit and data about connected devices with a timestamp for applied security policy or software upgrade after verification.

Figure 2:
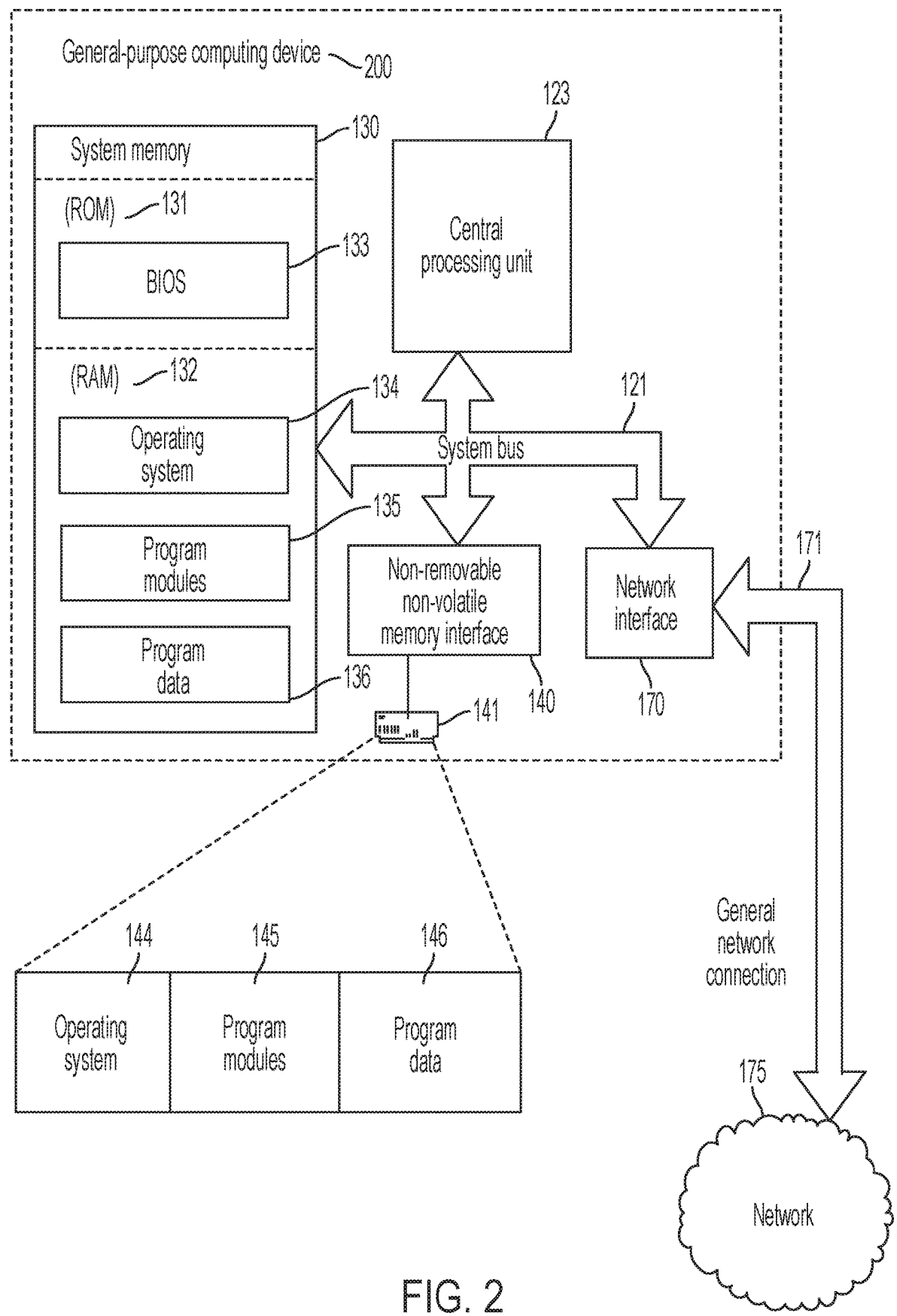
FIG. 2 illustrates an exemplary general-purpose computing device, in accordance with the embodiments disclosed herein.

With reference to FIG. 2, an exemplary general-purpose computing device is illustrated in the form of an exemplary general-purpose computing device 200. The general-purpose computing device 200 may be of the type utilized for the SN nodes 101, 102, 103, 104, 107 (FIG. 7), connected devices 109 (FIG. 7), as well as the other computing devices with which the SN system 100 may communicate through outside communication network 175. As such, it will be described with the understanding that variations can be made thereto. The exemplary general-purpose computing device 200 can include, but is not limited to, one or more central processing units (CPUs) 123, a system memory 130 and a system bus 121 that couples various system components including the system memory 130 to the CPU 123. The system bus 121 may be any of several types of bus structures including a memory bus or memory controller, a peripheral bus, and a local bus using any of a variety of bus architectures. Depending on the specific physical implementation, one or more of the CPUs 123, the system memory 130 and other components of the general-purpose computing device 200 can be physically co-located, such as on a single chip. In such a case, some or all of the system bus 121 can be nothing more than communicational pathways within a single chip structure and its illustration in FIG. 2 can be nothing more than notational convenience for the purpose of illustration.

The general-purpose computing device 200 also typically includes computer readable media, which can include any available media that can be accessed by computing device 200. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the general-purpose computing device 200. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

When using communication media, the general-purpose computing device 200 may operate in a networked environment via logical connections/communications to one or more remote computers. The logical connection depicted in FIG. 2 is a general network connection 171 to the communication network 175, which can be a local area network (LAN), a wide area network (WAN) such as the Internet, or other networks. The computing device 200 is connected to the general network connection 171 through a network interface or adapter 170 that is, in turn, connected to the system bus 121. In a networked environment, program modules depicted relative to the general-purpose computing device 200, or portions or peripherals thereof, may be stored in the memory of one or more other computing devices that are communicatively coupled to the general-purpose computing device 200 through the general network connection 171. It will be appreciated that the network connections/communications shown are exemplary and other means of establishing a communications link between computing devices may be used.

The general-purpose computing device 200 may also include other removable/non-removable, volatile/nonvolatile computer storage media. By way of example only, FIG. 2 illustrates a hard disk drive 141 that reads from or writes to non-removable, nonvolatile media. Other removable/non-removable, volatile/nonvolatile computer storage media that can be used with the exemplary computing device includes, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface, such as interface 140.

The drives and their associated computer storage media discussed above and illustrated in FIG. 2, provide storage of computer readable instructions, data structures, program modules and other data for the general-purpose computing device 200. In FIG. 2, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers here to illustrate that, at a minimum, they are different copies.

With reference to FIG. 1, again, the foregoing description applies to the SN system 100, as well as to any other computing devices in communication with the SN system 100 through outside communication network 175. The CPU 123 is coupled to the network interface 170. The network interface 170 facilitates outside communication in the form of voice and/or data. For example, the communication module may include a connection to a Plain Old Telephone Service (POTS) line, or a Voice-over-Internet Protocol (VOIP) line for voice communication. In addition, the network interface 170 may be configured to couple into an existing network, through wireless protocols (Bluetooth, 802.11a, ac, b, g, n, or the like) or through wired (Ethernet, or the like) communications, or through other more generic network communications. In still other configurations, a cellular link can be provided for both voice and data (i.e., GSM, CDMA or other, utilizing 2G, 3G, and/or 4G data structures and the like). The network interface 170 is not limited to any particular protocol or type of communication. It is, however, preferred that the network interface 170 be configured to transmit data bi-directionally, through at least one mode of communication. The more robust the structure of communication, the more manners in which to avoid a failure or a sabotage with respect to communication, such as to communicate an audio segment(s) in a timely manner.

The SN nodes 101, 102, 103, 104 comprise a user interface which can configure the SN nodes 101, 102, 103, 104. In many instances, the SN nodes 101, 102, 103, 104 comprise a keypad and a display that is connected through a wired connection with the CPU 123. Of course, with the different communication protocols associated with the network interface 170, the network interface 170 may comprise a wireless device that communicates with the communication network 175 through a wireless communication protocol (i.e., Bluetooth, RF, WIFI, etc.). In other embodiments, the SN nodes 101, 102, 103, 104 may comprise a virtual programming module in the form of software that is on, for example, a smartphone, in communication with the network interface 170. In still other embodiments, such a virtual programming module may be located in the cloud (or web based), with access thereto through any number of different computing devices. Advantageously, with such a configuration, a user may be able to communicate with the SN system 100 remotely, with the ability to change functionality.

In accordance with one or more embodiments disclosed herein, alternatives are possible without departing from the scope of the features disclosed. For example, FIG. 6 illustrates the SN light node 106 deployed as endpoint protection solution for the traditional blockchain node 104. The three phases or processes regarding the operation of the SN detection loop 608 described above also applies for a SN system 600. The SN system 600 includes endpoint protection for traditional blockchain nodes and/or any end user that is connected to blockchain. In this embodiment, the SN light node 106 is installed onto an end user device, e.g. including but not limited to the traditional blockchain node 104, as shown.

The SN light node 106 in this embodiment enables two modes of operation. The SN light node 106 can be configured to isolate browsers, email, and removable media in a virtual container, isolating malware and preventing this malware from harming the endpoint. The SN light node 106 can also be installed on an endpoint, such as on a host computing device as a virtual machine. In this configuration, the SN light node 106 is loaded early during boot-time of the host computing device. By loading early, the SN light node 106 significantly reduces the window in which malware can become active and harm the host computing device.

As discussed above for the initialization process, the initialization process for this embodiment works substantially the same way except that the SN light node 106 does not look to find other available nearby SN light node 106 in an 'operative mode', but only looks to find at least one SN full node 102 and at least one SN master node 103.

The SN light node 106 parses incoming events, such as via real-time network parser unit 310 (FIG. 5) and files/executables parser unit 312 (FIG. 5). The SN light node 106 provides observed events to the SN master node 103, as described above. The SN full node 102 provides the SN master node 103 with analysis results of the events being observed. Based on these observed events and the analysis the SN master node 103 performs healing of the host computing device by generating a security policy update, such as via security policy upgrade unit 115 (FIG. 3) and configuration updates, such as via device configuration update unit 116 (FIG. 3), and provides those updates to the SN light node 106. In a centralized environment embodiment, the SN full node 102 and the SN master node 103 can be deployed in the cloud and act as the security service cloud.

These interactions between the SN nodes 106, 102, 103 or SN light node 106 and the security service cloud enables the SN detection loop 608 disclosed herein. The SN detection loop 608 defeats a malware update loop of bad actors and further enables the SN light node 106 to perform updates while continuously monitoring for malware, eliminating dangerous gaps in security coverage. In at least one embodiment, the SN detection loop 608 writes a security update into the SN security blockchain ledger 130 and/or the traditional blockchain ledger 105. This provides a tamper-free record for a found exploit(s) and a fix for that found exploit(s) that could be used by an organization(s) and or an individual(s) to increase security of their own endpoints. In at least one embodiment, the SN detection loop 608 (FIG. 6) sends an acknowledgement message for found exploit(s) and/or the fix/security patch installed to third parties 112 that are involved in business or operation of the affected endpoint.

FIG. 7 illustrates another alternative embodiment in which a SN system 700 ensures end-to-end security for the connected devices 109 shown. In particular, the SN system 700 includes a plurality of device manufacturer nodes 107 coupled to a plurality of security detection loops 108, each of the plurality of security detection loops 108 also coupled to the SN security blockchain ledger 103. The SN security blockchain ledger 103 is also coupled to the plurality of connected devices 109.

The three phases or processes regarding the operation of the SN detection loop 108 described above also applies for the SN system 700. In this example, the SN system 700 includes a plurality, e.g., five, of device manufacturer nodes 107, a plurality, e.g., three, of SN detection loops 108, a SN security blockchain ledger 130, and a plurality, e.g., eight, connected devices 109. As shown the connected devices 109 include such user equipment (UE) as a smart car, a smart watch, a smart home, smart lighting, smart gas station, a drone, and another other UE that a user desires security for.

In accordance with the description above, the SN detection loop 108 becomes operational. In accordance with the example of FIG. 7, a device manufacturer node registers with the SN system 700 as a device manufacturer node 107. Upon identification of an attacked connected device 109 and after discovering a connected device 109 software exploit, the SN detection loop 108 sends a warning alert with data about a particular connected device 109, such as but not limited to a device id, device latest software update date and release number, to the device manufacturer node 107. Alternatively, or in addition to sending a warning alert to the device manufacturer node 107, the SN detection loop 108 notifies the third parties 112, such as those that are involved in business or operation with the affected connected device 109, such as but not limited to connected device owners, operators, and/or other beneficiaries.

In this example, the device manufacturer node 107 provides SN detection loop 108 with a security software upgrade intended to fix a found exploit. In response to this security software upgrade, the SN detection loop 108 verifies a manufacturer's signature. In at least one embodiment, the SN detection loop 108 will also test the security software upgrade against exploits and sets of attacks previously learned by SN detection loop 108. In the event that the security software upgrade is verified as secure by the SN detection loop 108, the SN detection loop 108 sends an acknowledgement message to the device manufacturer node 107, and in an example embodiment to the connected device 109. The SN detection loop 108 writes the security software upgrade to the SN security blockchain ledger 130.

Upon receipt of the acknowledgement message, the connected device 109 downloads the security software upgrade from the SN security blockchain ledger 130, and installs the security software upgrade to upgrade itself. Alternatively, the connected device 109 downloads the security software upgrade from the SN detection loop 108, and upgrades itself. Upon upgrade, the connected device 109 sends an upgrade acknowledgement message to the SN detection loop 108 and/or the device manufacturer node 107. Alternatively, or in addition to sending the upgrade acknowledgement message to the device manufacturer node 107, the SN detection loop 108 notifies the third parties 112 that are involved in business or operation with the affected connected device 109, such as but not limited to connected device owners, operators, and other beneficiaries. Upon receipt of the upgrade acknowledgement message, the SN detection loop 108 writes an upgrade detail into the SN security blockchain ledger 130.

Figure 8:
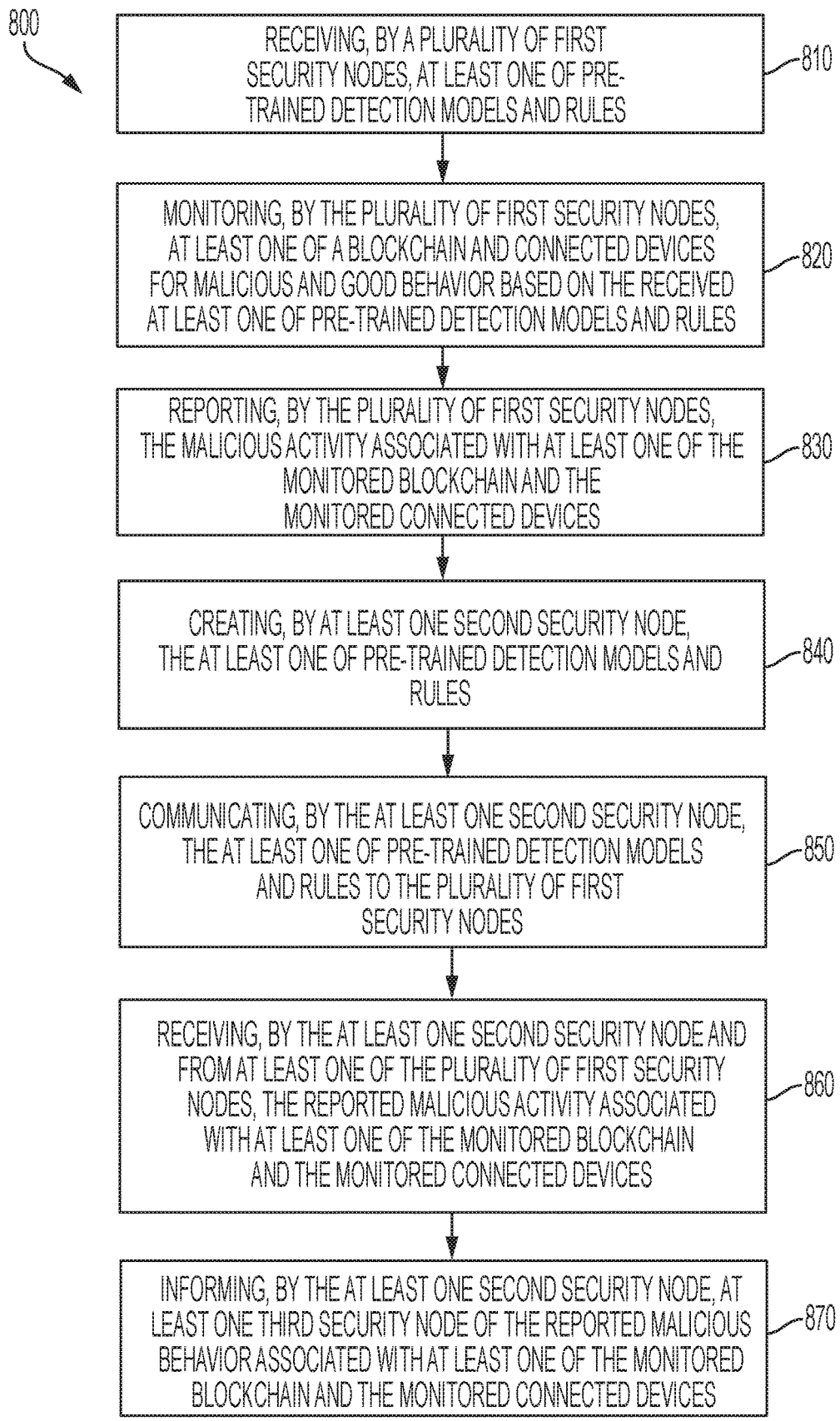
FIG. 8 illustrates an example flowchart for a method of detecting malicious behavior for a traditional blockchain node accessing a blockchain, in accordance with the embodiments disclosed herein.

FIG. 8 illustrates a flowchart for a method 800 of detecting the malicious behavior described herein. The method 800 described herein is exemplary and can further include the features described above for FIGS. 1-7 as performed by any of the devices therein.

In particular, the method 800 includes a process 810 comprised of receiving, by a plurality of first security nodes such as the SN light nodes 101, at least one of pre-trained detection models and rules. Process 810 proceeds to process 820.

The method 800 further includes a process 820 comprised of monitoring, by the plurality of first security nodes, at least one of a blockchain and connected device for malicious and good behavior based on the received at least one of pre-trained detection models and rules. In at least one embodiment, the blockchain of the method 800 is the traditional blockchain 125.

The method 800 further includes a process 830 comprised of reporting, by the plurality of first security nodes, the malicious behavior associated with at least one of the monitored blockchain and the monitored connected devices. In at least one embodiment, the monitored blockchain node is the traditional blockchain node 104 and the monitored connected devices are connected device 109.

The method 800 even further includes a process 840 comprised of creating, by at least one second security node SN full node 102, the at least one of pre-trained detection models and rules. In at least one embodiment, the at least one second security node of the method 800 is the SN full node 102.

The method 800 yet further includes a process 850 comprised of communicating, by the at least one second security node, the at least one of pre-trained detection models and rules to the plurality of first security nodes.

The method 800 further includes a process 860 comprised of receiving, by the at least one second security node and from at least one of the plurality of first security nodes, the reported malicious behavior associated with at least one of the monitored blockchain and the monitored connected devices.

The method 800 further includes a process 870 comprised of informing, by the at least one second security node, at least one third security node of the reported malicious behavior associated with at least one of the monitored blockchain and the monitored connected devices.

In at least one embodiment, the method 800 further includes forming, by the plurality of first security nodes, the at least one second security node, and the at least one third security node, a security detection loop such as the SN detection loop 108, the method 800 implementing a plurality of security detection loops each coupled to a security blockchain ledger such as the SN security ledger 130, the security blockchain ledger also coupled to at least one of the monitored blockchain and the monitored connected devices.

In at least one embodiment, the protocol of the method 800 and the system 100 is a consensus protocol, the method further comprising utilizing, by each of the plurality of security detection loops, the consensus protocol to guaranty validity of cybersecurity artifacts before sending warning alerts to at least one of a traditional blockchain node, such as the traditional blockchain node 104, and the third parties 112, add cybersecurity artifacts into a security blockchain ledger, such as the SN security blockchain ledger 130, and use the cybersecurity artifacts for training of self-learning detection models.

In at least one embodiment, the method 800 further includes for each of the plurality of first security nodes, such as the traditional blockchain node 104, one of installing on a traditional blockchain node and registering as an independent first security node running separately from the traditional blockchain node.

In at least one embodiment, the method 800 further includes registering, by each of the plurality of first security nodes, the at least one second security node, and the at least one third security node, themselves on the blockchain prior to the plurality of first security nodes monitoring at least one of the blockchain and the connected devices for malicious behavior.

In at least one embodiment, the method 800 further includes implementing, by the at least one second security node, self-learning to generate the at least one of pre-trained detection models and rules.

In at least one embodiment, the self-learning of the method 800 includes a plurality of neural networks and machine learning algorithms, the machine learning algorithms comprising at least one of a deep learning algorithm, a boosting algorithm, and a bagging approaches algorithm.

In at least one embodiment, at least one of the pre-trained detection models and rules of the method 800 include cybersecurity artifacts as security vulnerabilities in at least one of a smart contracts and digital assets, in at least one of binary formats and source code formats, malware in at least one of a smart contract, digital assets, end user computers, good/malicious smart contract patterns, good/malicious network attack traffic patterns, good/malicious behavior patterns by traditional blockchain nodes, good/malicious behavior patterns by the plurality of first security nodes, valid/non-valid signatures' patterns of an Internet of Things (IoT) manufacturer that places an IoT security upgrade as a programmable asset on the blockchain, valid/non-valid signature patterns of a network intrusion collaborating party that places a good/malicious network pattern update as a digital asset, a good/innocuous security software upgrade for a connected user equipment, and a vulnerable security software upgrade for the monitored connected devices.

In at least one embodiment, the monitoring by the first plurality of security nodes of the method 800 includes validating incoming network traffic for malicious attack patterns, validating at least one of programmable digital assets, smart contracts, files, and executables for malware and/or presence of exploits, validating security policy updates for innocuousness, validating an incoming security software upgrade for innocuousness, validating a signature pattern of an Internet of Things (IoT) manufacturer, and validating signature patterns of a network intrusion collaborating party.

In at least one embodiment, the method 800 includes calculating, by the plurality of first security nodes, a risk score as a basis to determine if at least one of the monitored blockchain and the monitored connected devices include the malicious behavior and achieving consensus through an asynchronous Byzantine fault tolerant (BFT) algorithm over the risk score as the basis to determine if at least one of the monitored blockchain and the monitored connected devices include the malicious behavior.

In at least one embodiment, method 800 further includes verifying, by the at least one second security node, the risk scores calculated by each of the plurality of first security nodes, identifies a particular risk score associated with a particular first security node as being outside of an accepted risk score range, and informs the at least one third security node that the particular risk score is outside of the accepted risk score range, and blocking or deactivating, by the at least one third security node, the particular first security node in response to the particular risk score being outside of the accepted risk score range.

In at least one embodiment, the method 800 includes achieving consensus, by the plurality of second security nodes, to decide whether a particular risk score associated with the particular first security node as being outside of the accepted risk score range.

In at least one embodiment, the method 800 includes achieving consensus, by a plurality of the third security node, to decide on blocking or deactivating the particular first security node in response to the particular risk score being outside of the accepted risk score range.

In at least one embodiment, the method 800 includes storing, by the at least one third security node, the risk scores calculated by each of the plurality of first security nodes in a security blockchain ledger for use by the at least one second security node to implement self-learning to generate the at least one of pre-trained detection models and rules.

In at least one embodiment, achieving consensus, by a plurality of the third security node, as a basis on deciding whether to store the risk scores calculated by each of the plurality of first security nodes in a security blockchain ledger for use by the at least one second security node to implement self-learning to generate the at least one of pre-trained detection models and rules.

In at least one embodiment, identifying, by the at least one second security node, a particular risk score associated with the plurality of first security nodes as being inside of an accepted risk score range, and informs the at least one third security node that the particular risk score is inside of the accepted risk score range, and deciding, by the at least one third security node, to reward the plurality of first security nodes for behaving honestly in response to the particular risk score being inside of the accepted risk score range.

In at least one embodiment, achieving consensus, by the plurality of second security nodes, to decide whether a particular risk score associated with the particular first security node as being outside of the accepted risk score range.

In at least one embodiment, achieving consensus, by a plurality of the third security node, to decide on blocking or deactivating the particular first security node in response to the particular risk score being outside of the accepted risk score range.

In at least one embodiment, storing, by the at least one third security node, the risk scores calculated by each of the plurality of first security nodes in a security blockchain ledger for use by the at least one second security node to implement self-learning to generate the at least one of pre-trained detection models and rules.

In at least one embodiment, achieving consensus, by a plurality of the third security node, as a basis on deciding whether to store the risk scores calculated by each of the plurality of first security nodes in a security blockchain ledger for use by the at least one second security node to implement self-learning to generate the at least one of pre-trained detection models and rules.

In at least one embodiment, the method 800 includes identifying, by the at least one second security node, a particular risk score associated with the plurality of first security nodes as being inside of an accepted risk score range, and informs the at least one third security node that the particular risk score is inside of the accepted risk score range, and deciding, by the at least one third security node, to reward the plurality of first security nodes for behaving honestly in response to the particular risk score being inside of the accepted risk score range.

In at least one embodiment, the method 800 includes achieving consensus, by a plurality of the second security node, to decide whether the particular risk score associated with a particular first security node is inside of an accepted risk score range.

In at least one embodiment, the method 800 includes achieving consensus, by a plurality of the third security node, as a basis to reward the plurality of first security nodes for behaving honestly in response to the particular risk score being inside of the accepted risk score range.

In at least one embodiment, the method 800 includes sending, by the at least one third security node, a security warning acknowledgement alert to the plurality of first security nodes, sending, by the plurality of first security nodes, the security warning alert to at least one of a traditional blockchain node and the third parties 112 in response to the security warning acknowledgement alert, and at least one of, by the plurality of first security nodes, blocking traffic from at least one of malicious connected devices and malicious blockchain nodes, placing vulnerable contracts into quarantine, and performing security configuration updates in response to the security warning acknowledgement alert.

In at least one embodiment, the method 800 includes storing, by a security blockchain ledger, a number of cybersecurity artifacts associated with the malicious and good behavior, the cybersecurity artifacts including a) at least one warning alert to at least one of traditional blockchain nodes and the third party 112 in response to a security breach, b) information about at least one of blocked malicious actors and malicious blockchain nodes, c) information about vulnerable smart contracts placed into quarantine, d) a smart contract with a vulnerability, e) a malicious smart contract, f) a non-malicious smart contract, g) a network traffic anomaly event, h) a non-malicious network event, i) a risk score associated with behavior of a particular first security node from the plurality of first security nodes as being outside of an accepted risk score range, j) a risk score associated with behavior of a particular first security node from the plurality of first security nodes as being inside of an accepted risk score range, k) a signature of an Internet of Things (IoT) manufacturer that places an IoT security upgrade as a programmable asset on the blockchain, l) a signature of a network intrusion collaborating party that places a non-malicious/malicious network patterns update as a digital asset, m) a non-malicious security software upgrade for a connected user equipment and, n) a vulnerable security software upgrade for at least one of the monitored connected devices, 0) at least one reward granted to at least one of the first, second and third security nodes for performing a cybersecurity defense for the monitored connected devices.

In at least one embodiment, the method 800 further includes using cybersecurity artifacts, stored on the security blockchain ledger, associated with the malicious and good behavior by the at least one second security node for self-learning to generate the at least one of pre-trained detection models and rules.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A system comprising:
a plurality of nodes forming a security loop, the plurality of nodes including a plurality of light nodes, a plurality of full nodes, and a master node,
wherein each of the plurality of nodes has one or more corresponding hardware processors and computer-readable media,
wherein the plurality of light nodes each use a trained malware detection model,
wherein the plurality of full nodes trained the trained malware detection model and supplied the trained malware detection model to the plurality of light nodes; and
wherein the computer-readable media of the plurality of nodes have instructions stored thereon, the instructions executable by corresponding ones of the hardware processors of the plurality of nodes to cause corresponding ones of the plurality of nodes to,
monitor, by the plurality of light nodes, blockchain for malicious behavior;
determine, by the plurality of light nodes, if first incoming data observed for the blockchain correspond to malicious behavior based on applying the trained malware detection model to the first incoming data;
based on the plurality of light nodes reaching a consensus that the first incoming data correspond to malicious behavior, report, by at least a first of the plurality of light nodes, the first incoming data to the plurality of full nodes as corresponding to malicious behavior;
verify, by the plurality of full nodes, if the first incoming data correspond to malicious behavior based on the trained malware detection model; and
based on the plurality of full nodes verifying that the first incoming data correspond to malicious behavior, inform, by at least a first of the plurality of full nodes, the master node that the first incoming data that were reported have been determined to correspond to malicious behavior associated with the blockchain.

2. The system of claim 1, wherein each of the plurality of light nodes is deployed as part of an existing node of the blockchain or is deployed separately from existing nodes of the blockchain.

3. The system of claim 1, wherein the trained malware detection model comprises a machine learning model that implements at least one of a deep learning algorithm, a boosting algorithm, and a bagging approaches algorithm.

4. The system of claim 1, wherein the instructions executable by corresponding ones of the hardware processors to cause the plurality of light nodes to monitor the blockchain comprise instructions executable by corresponding ones of the hardware processors to cause the plurality of light nodes to monitor at least one of incoming network traffic, smart contracts, security data associated with the blockchain.

5. The system of claim 1, wherein the instructions executable by corresponding ones of the hardware processors to cause the plurality of light nodes to determine if the first incoming data correspond to malicious behavior comprise instructions executable by corresponding ones of the hardware processors to cause the plurality of light nodes to calculate a first risk score based on application the trained malware detection model to the first incoming data.

6. The system of claim 5,
wherein the instructions executable by corresponding ones of the hardware processors to cause the plurality of full nodes to verify if the first incoming data correspond to malicious behavior comprise instructions executable by corresponding ones of the hardware processors to cause the plurality of full nodes to determine if the first risk score communicated by a particular one of the plurality of light nodes is outside of an accepted risk score range.

7. The system of claim 6, wherein the instructions executable by corresponding ones of the hardware processors to cause the plurality of full nodes to determine if the first risk score is outside of the accepted risk score range comprise instructions executable by corresponding ones of the hardware processors to cause the plurality of full nodes to determine if the first risk score is outside of the accepted risk score range based on the plurality of full nodes reaching a consensus that the first risk score is outside of the accepted risk score range.

8. The system of claim 1 further comprising instructions executable by corresponding ones of the hardware processors to cause the plurality of full nodes to provide the trained malware detection models to the plurality of light nodes based on training of the trained malware detection model.

9. The system of claim 6 further comprising instructions executable by corresponding ones of the hardware processors to cause corresponding ones of the plurality of nodes to, based on a determination by the plurality of full nodes that the first risk score is not outside of the accepted risk score range,
- inform, by the plurality of full nodes, the master node that the first risk score is inside of the accepted risk score range; and
- reward, by the master node, the plurality of light nodes for behaving honestly.

10. The system of claim 1 further comprising instructions executable by corresponding ones of the hardware processors to cause the master node to distribute rewards to at least one of the plurality of light nodes and the plurality of full nodes.

11. The system of claim 1 further comprising instructions executable by corresponding ones of the hardware processors to cause corresponding ones of the plurality of nodes to, based on the master node being informed that the first incoming data correspond to malicious behavior,
- send, by the master node, a security warning acknowledgement alert to the plurality of light nodes;
- send, by the plurality of light nodes in response to the security warning acknowledgement alert, a security alert to at least one of a node of the blockchain and third parties; and
- by the plurality of light nodes, at least one of block network traffic from a node of the blockchain associated with the malicious behavior, place the first incoming data into quarantine, and perform security configuration updates.

12. A method comprising:
- monitoring, by a plurality of light nodes, a blockchain for events corresponding to malicious behavior;
- determining, by the plurality of light nodes, if first incoming data observed for the blockchain correspond to malicious behavior based on applying a trained malware detection model to the first incoming data, wherein a plurality of full nodes supplied the trained malware detection model to the plurality of light nodes;
- based on the plurality of light nodes reaching a consensus that the first incoming data correspond to malicious behavior, reporting, by the plurality of light nodes, the first incoming data to the plurality of full nodes as corresponding to malicious behavior;
- verifying, by the plurality of full nodes, if the first incoming data reported by the plurality of light nodes correspond to malicious behavior based on the trained malware detection model that was supplied to the plurality of light nodes; and
- based on the plurality of full nodes verifying that the first incoming data correspond to malicious behavior, informing, by at least a first of the plurality of full nodes, a master node that the first incoming data that were reported have been determined to correspond to malicious behavior associated with the blockchain.

13. The method of claim 12, wherein the plurality of light nodes, the plurality of full nodes, and the master node form a security loop for the blockchain.

14. The method of claim 12, wherein each of the plurality of light nodes is deployed to an existing node of the blockchain or is deployed separately from existing nodes of the blockchain.

15. The method of claim 12, wherein the trained malware detection model comprises a machine learning model that implements at least one of a deep learning algorithm, a boosting algorithm, and a bagging approaches algorithm.

16. The method of claim 12, wherein monitoring the blockchain for malicious behavior comprises monitoring, by the plurality of light nodes, at least one of incoming network traffic, smart contracts, and security data associated with the blockchain.

17. The method of claim 12, wherein determining, by the plurality of light nodes, if the first incoming data correspond to malicious behavior comprises calculating, by the plurality of light nodes, a first risk score based on the plurality of light nodes applying the trained malware detection model to the first incoming data.

18. The method of claim 17,
wherein verifying, by the plurality of full nodes, if the first incoming data correspond to malicious behavior comprises calculating, by the plurality of full nodes, a second risk score and determining if the first risk score communicated by a particular one of the plurality of light nodes is outside of an accepted risk score range that is based on a difference between the first risk score and the second risk score.

19. The method of claim 18, wherein determining if the first risk score is outside of the accepted risk score range is based on the plurality of full nodes reaching a consensus that the first risk score is outside of the accepted risk score range.

20. The method of claim 18, further comprising, based on the plurality of full nodes determining that the first risk score is not outside of the accepted risk score range,
- informing the master node that the first risk score is inside of the accepted risk score range; and
- deciding, by the master node, to reward the plurality of light nodes for behaving honestly in response to the first risk score being inside of the accepted risk score range.

21. The method of claim 12, further comprising distributing, by the master node, rewards to at least one of the plurality of light nodes and the plurality of full nodes.

22. The method of claim 12, further comprising, based on the master node being informed that the first incoming data correspond to malicious behavior,
- sending, by the master node, a security warning acknowledgement alert to the plurality of light nodes;
- sending, by the plurality of light nodes, a security alert to at least one of a node of the blockchain and third parties in response to the security warning acknowledgement alert; and
- by the plurality of light nodes, at least one of blocking network traffic from a node of the blockchain associated with the malicious behavior, placing the first incoming data into quarantine, and performing security configuration updates in response to the security alert.

23. The system of claim 1, wherein the first incoming data comprise at least one of detected network traffic, a smart contract, and security data associated with the blockchain.

24. The system of claim 5, wherein the instructions executable by corresponding ones of the hardware processors to cause the plurality of light nodes to reach the consensus comprise instructions executable by corresponding ones of the hardware processors to cause the plurality of light nodes to, based on a first of the plurality of light nodes calculating the first risk score based on the first incoming data and the trained malware detection model, reach a consensus on the first risk score.

25. The system of claim 1, wherein the instructions executable by corresponding ones of the hardware processors to cause the plurality of light nodes to reach the consensus comprise instructions executable by corresponding ones of the hardware processors to cause the plurality of light nodes to reach the consensus based on an asynchronous Byzantine fault tolerant (BFT) consensus algorithm.

26. The system of claim 1, wherein the instructions executable by corresponding ones of the hardware processors to cause the plurality of full nodes to verify if the first incoming data correspond to malicious behavior comprise instructions executable by corresponding ones of the hardware processors to cause the plurality of full nodes to utilize a proof-of-stake (PoS)-based consensus to verify if the first incoming data correspond to malicious behavior.

27. The system of claim 3 further comprising instructions executable by corresponding ones of the hardware processors to cause the plurality of full nodes to train the machine learning model to generate the trained malware detection model based on a plurality of cybersecurity artifacts associated with the blockchain.

28. The system of claim 6 further comprising instructions executable by corresponding ones of the hardware processors to cause the plurality of full nodes to calculate a second risk score based on the trained malware detection model and first incoming data, wherein the accepted risk score range is based on a difference between the first risk score and the second risk score.

29. The system of claim 6 further comprising instructions executable by corresponding ones of the hardware processors to cause corresponding ones of the plurality of nodes to, based on a determination by the plurality of full nodes that the first risk score is outside of the accepted risk score range,
inform, by the plurality of full nodes, the master node that the first risk score is outside of the accepted risk score range; and
block or deactivate, by the master node, the particular one of the plurality of light nodes.

30. The method of claim 17, wherein the plurality of light nodes reaching the consensus comprises, based on a first of the plurality of light nodes calculating the first risk score based on applying the trained malware detection model to the first incoming data, the plurality of light nodes reaching a consensus on the first risk score.

31. The method of claim 12, wherein verifying, by the plurality of full nodes, if the first incoming data correspond to malicious behavior comprises utilizing, by the plurality of full nodes, a proof-of-stake (PoS)-based consensus to verify if the first incoming data correspond to malicious behavior.

32. The method of claim 12, wherein the first incoming data comprise at least one of detected network traffic, a smart contract, and security data associated with the blockchain.

33. The method of claim 12, wherein the plurality of light nodes reaching the consensus comprises the plurality of light nodes reaching the consensus based on an asynchronous Byzantine fault tolerant (BFT) consensus algorithm.

34. The method of claim 15 further comprising training, by the plurality of full nodes, the machine learning model to generate the trained malware detection model based on a plurality of cybersecurity artifacts associated with the blockchain.

35. The method of claim 18, wherein calculating the second risk score comprises calculating, by plurality of full nodes, the second risk score based on applying the trained malware detection model to the first incoming data.

36. The method of claim 18 further comprising, based on the plurality of full nodes determining the first risk score is outside of the accepted risk score range,
the plurality of full nodes informing the master node that the first risk score is outside of the accepted risk score range; and
the master node blocking or deactivating the particular one of the plurality of light nodes.

37. One or more non-transitory computer-readable media having computer-readable instructions stored thereon, the computer-readable instructions executable by one or more hardware processors to:
monitor, by a plurality of light nodes, a blockchain for events corresponding to malicious behavior;
determine, by the plurality of light nodes, whether first incoming data observed for the blockchain correspond to malicious behavior based on application of a trained malware detection model to the first incoming data, wherein a plurality of full nodes supplied the trained malware detection model to the plurality of light nodes;
based on the plurality of light nodes reaching a consensus that the first incoming data correspond to malicious behavior, report, by the plurality of light nodes, the first incoming data to the plurality of full nodes;
verifying, by the plurality of full nodes, whether the first incoming data reported by the plurality of light nodes correspond to malicious behavior based on the trained malware detection model; and
based on the plurality of full nodes verifying that the first incoming data correspond to malicious behavior, informing, by at least a first of the plurality of full nodes, a master node that the first incoming data have been determined to correspond to malicious behavior.

38. The non-transitory computer-readable media of claim 37 further comprising computer-readable instructions to train, by the plurality of full nodes, a machine learning model to generate the trained malware detection model based on a plurality of cybersecurity artifacts associated with the blockchain.

39. The non-transitory computer-readable media of claim 37, wherein the computer-readable instructions to monitor the blockchain for malicious behavior comprise computer-readable instructions to monitor, by the plurality of light nodes, at least one of incoming network traffic, smart contracts, and security data associated with the blockchain.

40. The non-transitory computer-readable media of claim 37, wherein the computer-readable instructions to determine if the first incoming data correspond to malicious behavior comprise computer-readable instructions to calculate, by the plurality of light nodes, a first risk score based on application of the trained malware detection model to the first incoming data.

41. The non-transitory computer-readable media of claim 40, wherein the computer-readable instructions to reach a consensus by the plurality of light nodes that the first incoming data correspond to malicious behavior comprise computer-readable instructions to,
calculate, by a first of the plurality of light nodes, the first risk score; and
reach a consensus on the first risk score by the plurality of light nodes.

42. The non-transitory computer-readable media of claim 40, wherein the computer-readable instructions to verify whether the first incoming data correspond to malicious behavior comprise computer-readable instructions to calculate, by the plurality of full nodes, a second risk score based on the incoming first data and the trained malware detection model and determine whether the first risk score is outside of a first range, wherein the first range is based on a difference between the first risk score and the second risk score.

* * * * *